United States Patent [19]

Ueda et al.

[11] Patent Number: 5,340,654
[45] Date of Patent: * Aug. 23, 1994

[54] INTERLAYER FILM FOR LAMINATED GLASS

[75] Inventors: Naoki Ueda, Osaka; Kenichi Asahina, Shiga; Hirohumi Omura, Shiga; Jiro Miyai, Shiga, all of Japan

[73] Assignee: Sekisui Kagaku Kogyo Kabushiki Kaisha, Osaka, Japan

[*] Notice: The portion of the term of this patent subsequent to Mar. 2, 2010 has been disclaimed.

[21] Appl. No.: 33,586

[22] Filed: Mar. 18, 1993

[30] Foreign Application Priority Data

Apr. 23, 1992 [JP] Japan .................. 4-104589

[51] Int. Cl.$^5$ .............................................. B32B 17/10
[52] U.S. Cl. .................................... 427/437; 428/515; 428/524; 428/525
[58] Field of Search ................ 428/524, 525, 515, 437

[56] References Cited

U.S. PATENT DOCUMENTS 5,190,826  3/1993  Asahina et al. ............... 428/515

FOREIGN PATENT DOCUMENTS

| | | |
|---|---|---|
| 0457190 | 11/1991 | European Pat. Off. . |
| 2209787 | 12/1973 | France . |
| 2291247 | 11/1975 | France . |
| 40-3267 | 2/1940 | Japan . |
| 46-5830 | 2/1971 | Japan . |
| 51-106190 | 9/1976 | Japan . |
| 60-27630 | 2/1985 | Japan . |
| 62-9928 | 1/1987 | Japan . |
| 62-10106 | 1/1987 | Japan . |
| 62-37148 | 2/1987 | Japan . |
| 62-278148 | 12/1987 | Japan . |
| 2-229742 | 9/1990 | Japan . |
| 3124441 | 8/1991 | Japan . |
| 4254444 | 9/1992 | Japan . |

Primary Examiner—Edith Buffalow
Attorney, Agent, or Firm—Townsend & Banta

[57] ABSTRACT

An interlayer film for laminated glass comprising laminated layers of at least one layer (A) which comprises a plasticizer and polyvinyl acetal resin for which the number of carbon atoms in the acetal group is 4, 5 or 6 and the mole ratio of the average amount of the ethylene groups bonded to acetyl groups is 8-30 mole % of the total amount of the main chain ethylene groups, and at least one layer (B) which comprises a plasticizer and polyvinyl acetal resin for which the number of carbon atoms in the acetal group is 3 or 4 and the mole ratio of the amount of the average ethylene groups bonded to acetyl groups is 4 mole % or less of the total amount of the main chain ethylene groups.

8 Claims, 1 Drawing Sheet

INTERLAYER FILM FOR LAMINATED GLASS

BACKGROUND OF THE INVENTION

1. Field of the Invention

This invention relates to an interlayer film for laminated glass which has a superior sound insulation quality.

2. The Prior Art

In general, laminated glass comprising two sheets of glass sandwiching a resin film is superior in terms of safety because fragments do not fly about even if the glass is broken, and therefore, for example, it is widely used as windshield glass for transportation vehicles such as automobiles and window glass for buildings.

Of these interlayer films for laminated film, the polyvinyl butyral resin film plasticized by the addition of a plasticizer has superior adhesiveness to glass, high tensile strength, and high transparency, and therefore the laminated glass using this film is particularly suitable as windshield glass for vehicles.

In general, sound insulation performance is indicated as the transmission loss at varying frequencies. Sound insulation is prescribed in JIS A4708 as a constant value at 500 Hz or above, depending on the sound insulation grade, as shown in FIG. i with a solid line. The sound insulation of glass plates substantially decreases in the frequency range centered around 2000 Hz because of the coincidence effect (the dotted-line valley shown in FIG. 1 corresponds to the reduction of the sound insulation performance caused by the coincidence effect, where the prescribed sound insulation performance is not maintained)- The "coincidence effect" mentioned here stands for the phenomenon wherein, when the sound wave hits the glass plate, the rigidity and the inertia of the glass plate cause propagation of transverse waves on the glass surface, and these transverse waves resonate with the incident sound, resulting in sound transmission.

Although conventional laminated glass is superior in terms of the prevention of scattered fragments, it cannot avoid the reduction in sound insulation performance caused by the coincidence effect in the frequency range centered around 2000 Hz, and thus improvements are called for in this respect.

On the other hand, based on the loudness-level contour, it is known that human hearing is much more sensitive to sound in the range of 1000–6000 Hz compared with other frequency ranges, indicating that it is very important for purposes of sound control to eliminate the drop in sound insulation performance caused by the coincidence effect.

In order to improve the sound insulation performance of laminated glass, it is necessary to mitigate the coincidence effect described above to prevent the decrease in the minimum transmission loss caused by the coincidence effect (hereafter, this minimum is referred to as the "TL value", as shown in FIG. 1).

There have been various countermeasures proposed as means to prevent the decrease in the TL value, such as an increase in the mass of the laminated glass, multi-layered glass, segmentation of the glass area and improvement of the means to support the glass plate. However, none of these have produced sufficiently satisfactory effects, and their cost is not sufficiently low for practical use.

Recently, the requirement for sound insulation performance has increased more and more, and, for example, superior sound insulation performance around room temperature is required for building window glass. That is, what is required as superior sound insulation performance is that the temperature at which the sound insulation performance is the highest, determined by plotting the transmission loss (TL value) against the temperature (temperature of the maximum sound insulation performance=TLmax temperature), is around room temperature, and that the maximum value of the sound insulation performance (maximum value of the sound insulation performance=TLmax value) itself is high.

However, conventional laminated glass for automobile windshield glass using plasticized polyvinyl butyral resin films has a problem in that the temperature of the maximum sound insulation performance is higher than room temperature and that the sound insulation performance is not good around room temperature.

As for prior arts which attempted to improve the sound insulation performance of laminated glass, for example, Tokko (Japanese examined patent publication) Sho-46-5830 describes an interlayer film comprising a resin, such as polyvinyl butyral, which has an approximately 3 times higher fluidity than the fluidity of normal interlayer films in the flow stage in the molding. However, this has a serious problem in that the absolute value of the sound insulation performance of the laminated glass is low.

Tokkai (Japanese unexamined patent publication) Hei-2-229742 describes an interlayer film comprising laminated layers of polymer films with a glass transition temperature of 15° C. or lower, such as a vinyl chloride-ethylene-glycidyl methacrylate co-polymer film, and a plasticized polyvinyl acetal film, for example. However, this does not show a sound insulation performance higher than grade Ts-35 in the sound insulation grade system according to JIS A4706, and furthermore, the temperature range in which it insulates against sound is limited, thus it cannot have a good sound insulation performance over a wide temperature range.

Tokkai Sho-62-37148 proposes, for the purpose of preventing a decrease in the sound insulation performance in the coincidence range of the rigid plate (glass plate), an interlayer film comprising laminated layers of two or more viscoelastic materials with different acoustic resistances, such as a polymethyl methacrylate film and a vinyl chloride-ethylene-glycidyl methacrylate co-polymer film, for example. However, this does not have a satisfactory sound insulation performance in the initial stage, and furthermore, it has a durability problem in that the performance deteriorates over long term use. The cause of this is that these resins undergo mass transfers because of the diffusion action at the interface, resulting in a diminished effectiveness as a constraint layer at the interface.

Tokkai Sho-60-27630 proposes an interlayer film comprising a poly vinyl chloride resin containing a plasticizer as a means to increase the sound insulation in the initial stage. Although this interlayer film has somewhat better initial sound insulation, the lamination process conditions have to be changed from the conditions for polyvinyl butyral interlayer films. Currently, polyvinyl butyral interlayer films are still the mainstream as the materials for laminated glass interlayer films, and, in the present situation, the preliminary bonding conditions of the lamination process are set at the conditions for polyvinyl butyral interlayer films.

Tokkai Sho-62-278148 proposes an interlayer film for laminated glass with low self-adhesion comprising a polyvinyl acetal resin whose acetal groups have a carbon number of 6–10 and a plasticizer. However, this interlayer film does not quite have sufficient sound insulation.

Tokkai Sho-51-106190 proposes to obtain a structure which has a damping effect in a wide temperature range by laminating two or more resins with different glass transition temperatures. This structure is found to have an improved damping effect over a wide temperature range. However, this Tokkai does not have descriptions about sound insulation and transparency necessary for laminated glass, and this structure does not satisfy the requirements for safety glass, such as high shock energy absorbion, and the prevention of scattering of fragments when the glass breaks.

Tokkai Sho-62-10106 proposes polyvinyl butyral with moderate cross-links by means of inter-molecular bonding. However, the laminated glass which comprises this resin and an added plasticizer has a sound insulation of only about 30 dB around room temperature.

Tokkai Hei-3-124441 describes an interlayer film comprising two or more laminated layers of polyvinyl butyral containing a plasticizer and with different degrees of polymerizations. However, the desired sound insulation performance cannot possibly be obtained by just laminating two or more layers of polyvinyl butyral with different degrees of polymerization.

Tokkai Sho-62-9928 describes extruded sheets comprising polyvinyl butyral resin with moderate cross-links by means of stable inter-molecular bonding and a plasticizer. However, this does not even qualify as grade JIS 30 around room temperature, and therefore the sound insulation performance is too poor.

Tokkai Hei-4-254444 proposes an interlayer film comprising laminated layers of a film of polyvinyl acetal resin whose acetal groups have a carbon number of 6–10 and a plasticizer, and a film of polyvinyl acetal resin whose acetal groups have a carbon number of 1–4 and a plasticizer. This interlayer film is found to have improved sound insulation, and its sound insulation performance does not vary significantly with varying temperatures. However, these effects are still not sufficient.

Of the interlayer films disclosed in Tokkai Hei-4-254444 described above, the interlayer film comprising films of polyvinyl butyral and a plasticizer laminated on both sides of a film of polyvinyl acetal whose acetal groups have a carbon number of 6–8 and a plasticizer qualifies as grade JIS 35, showing an improvement in the sound insulation performance. However, this does not show good sound insulation over a wide temperature range, which is an important requirement for a sound insulating interlayer film.

Tokko-Sho 40-3267 discloses the interlayer for safety laminated glass having 2 polyvinyl butyral films. However, this patent does not discuss a sound insulation quality. As we have shown so far, laminated glass which shows a superior sound insulation performance over a particularly wide temperature range and for a long period of time cannot be configured using the interlayer films of the prior arts described above.

Considering the points described above, the object of this invention is to provide a sound insulating interlayer film for laminated glass which does not hamper the basic properties necessary for laminated glass, such as transparency, weather resistance, shock energy absorption and adhesion to glass, prevents a decrease in the TL value by mitigating the coincidence effect, and maintains a superior sound insulation performance over a wide temperature range for a long period of time.

SUMMARY OF THE INVENTION

The inventors observed the fact that a film comprising polyvinyl acetal plasticized with a plasticizer, which is used as an interlayer film for laminated glass, has a good balance between various characteristics such as transparency, weather resistance, shock energy absorption and adhesion to glass, and investigated the improvement of an interlayer film which has polyvinyl acetal as the resin component, in order to improve the sound insulation without spoiling these desirable characteristics.

As a result, we found out that the coincidence effect can be mitigated around room temperature when two glass plates sandwich laminated layers of at least one of each of two kinds of polyvinyl acetal films comprising polyvinyl acetal resin which has a specific amount of acetyl groups obtained by acetalizing polyvinyl alcohol with aldehyde, and thus completed this invention.

That is, the interlayer film for laminated glass of this invention comprises laminated layers of at least one layer (A) which comprises a plasticizer and polyvinyl acetal resin for which the number of carbon atoms in the acetal group is 4, 5 or 6 and the mole ratio of the average amount of the ethylene groups bonded to acetyl groups (i.e. the residual acetyl group amount) is 8–30 mole % of the total amount of the main chain ethylene groups, and at least one layer (B) which comprises a plasticizer and polyvinyl acetal resin for which the number of carbon atoms in the acetal group is 3 or 4 and the mole ratio of the amount of average ethylene groups bonded to acetyl groups is 4 mole % or less of the total amount of the main chain ethylene groups.

The second interlayer film for laminated glass of this invention comprises the first interlayer film, wherein the standard deviation, $\sigma$ (sigma), of the amount of the ethylene groups bonded to acetyl groups is 0.8 or less for the polyvinyl acetal resin in layer (A).

The third interlayer film for laminated glass of this invention comprises the first interlayer film, wherein the standard deviation, $\sigma$ of the amount of the ethylene groups bonded to acetyl groups is 2.5–8 for the polyvinyl acetal resin in layer (A).

The fourth interlayer film for laminated glass of this invention comprises the first interlayer film, wherein the polyvinyl acetal resin in layer (A) has a molecular weight distribution ratio (weight average molecular weight Mw/number average molecular weight Mn) of 1.01–1.50.

The fifth interlayer film for laminated glass of this invention comprises the first interlayer film, wherein the polyvinyl acetal resin in layer (A) has a molecular weight distribution ratio (weight average molecular weight Mw/number average molecular weight Mn) of 3.5–20.

The sixth interlayer film for laminated glass of this invention comprises the first interlayer film, wherein, of a plurality of laminated layers, at least the outermost layer on the side which needs to be weather-resistant comprises layer (B) that contains an ultraviolet light absorbent with an effective ultraviolet light absorption wave length of 300–340 nm so that the ultraviolet light absorption coefficient is 0.01 or more.

The seventh interlayer film for laminated glass of this invention comprises the first interlayer film, wherein the degree of blocking, Y, of the ethylene groups bonded to acetyl groups, as defined below, is 0.15–0.40 for the polyvinyl acetal resin in layer (A)

The eighth interlayer film for laminated glass of this invention comprises the first interlayer film, wherein the degree of blocking, Y, of the ethylene groups bonded to acetyl groups, as defined below, is 0.55–0.90 for the polyvinyl acetal resin (A).

Degree of blocking $Y = 0.5 \times S/(T \times U)$ where, S, T and U in the equation stand for the amount of the methylene groups (S), the amount of the hydroxyl groups (T) and the amount of the acetyl groups (U), respectively, in the —CH(OH)—CH$_2$-(OCOCH$_3$)-CH— structure.

DETAILED DESCRIPTION OF THE INVENTION

Polyvinyl acetal resins in layer (A) and (B) are obtained by acetalizing polyvinyl alcohol with aldehyde, and usually have acetal groups, acetyl groups and hydroxyl groups on the ethylene groups of the main chain.

The average degree of polymerization for polyvinyl alcohol, which is a raw material for the polyvinyl acetal resin, is preferably 500–3000. If the degree of polymerization is less than 500, the laminated glass will have poor penetration resistance, and if it is more than 3000, then its strength is too high for normal use as a safety glass. A more preferable degree of polymerization is 1000–2500. Hereinafter polyvinyl acetal resin (A) is in layer (A) and polyvinyl acetal resin (B) in layer (B).

For the aldehyde with a 4–6 carbon atoms which is used to obtain the polyvinyl acetal resin (A) whose acetal groups have 4–6 carbon atoms, aldehydes such as n-butyl aldehyde, isobutyl aldehyde, valer aldehyde, n-hexyl aldehyde and 2-ethylbutyl aldehyde are used individually or in appropriate combination. When the carbon number of the aldehyde is less than 4, a sufficient sound insulation performance cannot be achieved. Aldehydes with a carbon number of more than 6 have very poor reactivity in the acetalization reaction, and furthermore, the interlayer films obtained do not show a sufficient sound insulation performance around room temperature. More preferable aldehydes are n-butyl aldehyde, isobutyl aldehyde and n-hexyl aldehyde, and they are used individually or in combination.

For the aldehyde with 3–4 carbon atoms which is used to obtain the polyvinyl acetal resin (B) whose acetal groups have a 3–4 carbon atoms, aldehydes such as propion aldehyde, n-butyl aldehyde and isobutyl aldehyde are used individually or in combination of two or more.

For the polyvinyl acetal resin (A), the average of the residual acetyl group amount is limited to within the range of 8–30 mole %. The reason why is that the sound insulation performance is not sufficient when this amount is 8 mole % or less, and the reaction ratio of the aldehyde significantly decreases when it is 30 mole % or more. For polyvinyl acetal resin (A), a more preferable value of the average acetyl group amount is 10–24 mole %.

For the polyvinyl acetal resin (B), the average of the residual acetyl group amount is limited to 4 mole % or less. The reason why is that, when this amount is 4 mole % or more, the difference between it and the average value of the residual acetyl group amount for the polyvinyl acetal resin(A) is small and the sound insulation performance is not good. For the polyvinyl acetal resin (B), a more preferable value of the average acetyl group amount is 0–2 mole %.

For the polyvinyl acetal resins (A) and (B), it is particularly preferable to use n-butyl aldehyde. By using n-butyl aldehyde, the adhesion strength between the layers constituting the laminated film becomes greater, and the polyvinyl acetal resin can be obtained in the same manner as the conventional synthesis process for butyral resin.

For the polyvinyl acetal resins (A) and (B), use of a mixture of two or more types of polyvinyl acetal resin obtained by acetalizing polyvinyl alcohol with the aldehyde described above for each of them, or use of a polyvinyl acetal resin obtained by using, for acetalization, other aldehydes, the amount of which is 30 wt % or less of the total acetal amount, as well as the aldehydes described above, does not exceed the scope of this invention.

The degree of acetalization for the polyvinyl acetal resin (A) is preferably 40 mole % or more. If the degree of acetalization is less than 40 mole %, then compatibility with the plasticizer is poor and it is difficult to add the necessary amount of plasticizer for adequate sound insulation performance. A more preferable degree of acetalization is 50 mole % or more.

The degree of acetalization for the polyvinyl acetal resin (B) is preferably 50 mole % or more. If the degree of acetalization is less than 50 mole %, then compatibility with the plasticizer is poor and it is difficult to add the necessary amount of plasticizer to secure adequate penetration resistance.

In this invention, one way to obtain the polyvinyl acetal resins (A) and (B) is, for example, by dissolving polyvinyl alcohol in hot water, keeping the resulting polyvinyl alcohol solution at a prescribed temperature, adding the aldehyde described above and the catalyst(s) to it, letting the acetalization reaction proceed, and then, after keeping the reaction solution at a prescribed high temperature, obtaining the resin powder through neutralizing, water rinsing and drying processes.

For the second interlayer film, the mole ratio of the average amount of the ethylene groups bonded to acetyl groups, i.e. the residual acetyl group amount, is also 8–30 mole % of the total amount of the main chain ethylene groups for the polyvinyl acetal resin (A). If the average of the residual acetyl group amount is less than 8 mole %, then, although the sound insulation performance is good in the temperature range higher than room temperature, sometimes it is not possible to achieve a good sound insulation performance around room temperature. On the other hand, if the average of the residual acetyl group amount exceeds 30 mole %, then the sound insulation performance is good at low temperatures, but again it is difficult to achieve a good sound insulation performance around room temperature. A more preferable average value of the residual acetyl group amount is 12–24 mole %.

For the polyvinyl acetal resin (A), the standard deviation, $\sigma$, of the fraction of the ethylene groups bonded to acetyl groups is 0.8 or less. If the standard deviation sigma exceeds 0.8, then sometimes the maximum value of the sound insulation performance decreases. A particularly preferable range for the standard deviation sigma of the fraction of the ethylene groups bonded to acetyl groups is 0.5 or less.

For the third interlayer film, the average value of the residual acetyl group amount for the polyvinyl acetal resin (A) is also 8–30 mole %. For the polyvinyl acetal resin (A), a more preferable range for the molar fraction described above is 12–22 mole %.

For the polyvinyl acetal resin (A), the standard deviation, $\sigma$, of the fraction of the ethylene groups bonded to acetyl groups is 2.5–8. If the standard deviation sigma is less than 2.5, then sometimes it is not possible to achieve good sound insulation over a wide temperature range. On the other hand, if the standard deviation sigma exceeds S, then sometimes the maximum value of the sound insulation performance decreases. A particularly preferable range for the standard deviation sigma of the fraction of the ethylene groups bonded to acetyl groups is 3–6.

The polyvinyl acetal resins with a standard deviation of 2.5–8, as described above, can be obtained, for example, by conducting saponification of polyvinyl acetate in several stages, and then acetalizing the polyvinyl alcohol obtained, or by acetalizing a blend of a plurality of polyvinyl alcohols with different degrees of saponification, or by blending a plurality of polyvinyl acetals with different acetyl group amounts. The economically most preferable process is to adjust the distribution of the ethylene groups bonded to acetyl groups at the polyvinyl alcohol stage, and acetalize this polyvinyl alcohol.

For the second and third interlayer films, the standard deviation, sigma, of the fraction of the ethylene groups bonded to acetyl groups for the polyvinyl acetal resin (B) is not limited as far as the improvement in the sound insulation performance is concerned.

For the fourth interlayer film, by using the polyvinyl acetal resin (A) with a molecular weight distribution ratio (Mw/Mn) of 1.01–1.50, the coincidence effect around room temperature is significantly mitigated, and it is possible to achieve superior sound insulation performance, higher than grade Ts-35 in the sound insulation grade system according to JIS A4706.

It is difficult to synthesize resins which have a molecular weight distribution ratio (Mw/Mn) of less than 1.01, and, on the other hand, if this ratio is higher than 1.50, then the TL value decreases.

A polyvinyl acetal resin with such a narrow molecular distribution range can be obtained, for example, by using fractionation chromatography and fractionating a known polyvinyl acetal.

For the fifth interlayer film, by using the polyvinyl acetal resin (A) with a molecular weight distribution ratio (Mw/Mn) of 3.5–20, the coincidence effect is significantly mitigated over a wide temperature range, and superior sound insulation performance is achieved.

If the molecular weight distribution ratio (Mw/Mn) is less than 3.5, then the temperature range in which the coincidence effect is mitigated becomes narrower, and good sound insulation performance may not be achieved over a wide temperature range. If the molecular weight distribution ratio (Mw/Mn) is over 20, then it is hard to achieve a sound insulation performance which exceeds grade Ts-35.

A polyvinyl acetal resin with such a broad molecular distribution range can be obtained, for example, by blending a plurality of polyvinyl alcohols with different molecular weights and then conducting the acetalization reaction, or by blending polyvinyl acetals with different molecular weights.

For the fourth and fifth interlayer films, the number average molecular weight Mn of the polyvinyl acetal resin(s) is preferably 27,000–270,000, and more preferably 45,000–235,000. If Mn of the polyvinyl acetal resin is smaller than 27,000, then the laminated glass obtained has poor penetration resistance. If Mn is greater than 270,000, then the laminated glass obtained has too much strength and may not be able to be used as safety glass.

For the sixth interlayer film, at least the outmost layer on the side which needs to be weather-resistant, of the laminated layers, comprises layer (B) that contains an ultraviolet light absorbent with an effective ultraviolet light absorption wave length of 300–340 nm so that the ultraviolet light absorption coefficient X is 0.01 or more.

Here, the ultraviolet light absorption coefficient X is defined as {film thickness t (mm) of the layer (B) used as the outmost layer on the side which needs to be weather-resistant}×{parts u (weight parts) of the ultraviolet light absorbent added}.

For the seventh interlayer film, the polyvinyl acetal resin for which the degree of blocking of the ethylene groups bonded to acetyl groups is 0.15–0.40 is obtained by acetalizing polyvinyl alcohol for which the degree of blocking of the ethylene groups bonded to acetyl groups is 0.15–0.40. By using polyvinyl alcohol with such a high degree of blocking, a polyvinyl acetal resin which has, in terms of viscoelasticity, a mechanical loss tangential curve with little temperature dependence is obtained. By using this resin for the polyvinyl acetal resin (A) for the first interlayer film, a superior sound insulating interlayer film which can efficiently convert acoustic energy to thermal energy is obtained. A synthesis process(es) for polyvinyl alcohol with such a high degree of blocking is described, for example, in Tokko Sho-37-17385.

If the degree of blocking mentioned above is smaller than 0.15, then the TL value at all temperatures may markedly decrease. If the degree of blocking is greater than 0.40, then good sound insulation performance may not be achieved over a wide temperature range. A more preferable range of the degree of blocking is 0.20–0.35.

For the eighth interlayer film, the polyvinyl acetal resin for which the degree of blocking of the ethylene groups bonded to acetyl groups is 0.55–0.90 is obtained by acetalizing polyvinyl acetal for which the degree of blocking of the ethylene groups bonded to acetyl groups is 0.55–0.90. By using polyvinyl alcohol with such a high degree of randomness, polyvinyl acetal with a low glass transition temperature is obtained. By using this as the polyvinyl acetal resin (A) for the first interlayer film, a superior sound insulating interlayer film which has good fluidity and can efficiently convert acoustic energy to thermal energy is obtained. A synthesis process(es) for polyvinyl alcohol with such a high degree of randomness is described, for example, in Tokkai Hei-2-255806.

If the degree of blocking mentioned above is smaller than 0.55, then a superior sound insulation performance may not be achieved. If the degree of blocking is greater than 0.90, then the degree of acetalization decreases and therefore the shock resistance, which is a basic characteristic for an interlayer film, may decrease. A more preferable range of the degree of blocking is 0.65–0.80.

As for the definition of the degree of blocking, $Y=0.5\times S/(T\times U)$, for the seventh and eighth interlayer films. S, T and U in the equation are obtained by 13C-NMR measurements, and they stand for the amount of the methylene groups (S), the amount of the hydroxyl groups (T) and the amount of the acetyl groups (U), respectively, in the —CH(OH)—CH$_2$—(OCOCH$_3$)CH— structure.

For the polyvinyl acetal resin (A) for the interlayer films of this invention, cross-linked polyvinyl acetal resins whose 10 wt % solution dissolved in a mixed solvent of ethanol and toluene (weight ratio 1:1) shows a viscosity of 200–1000 centipoise (cP), when measured with a BM type viscometer, are preferably used.

By using the cross-linked polyvinyl acetal resins mentioned above, interlayer films for laminated glass which have superior sound insulation performance around room temperature and a widened temperature range in which acoustic energy is efficiently converted to thermal energy, thus having superior sound insulation performance over a wide temperature range around room temperature, are obtained.

If the viscosity mentioned above is smaller than 200 cP, then good sound insulation performance over a wide range may not be achieved. If it exceeds 1000 cP, then the temperature dependent change of the sound insulation performance becomes less, but the absolute value of the sound insulation becomes smaller and it may become difficult to manufacture the resin and/or to form the films. A viscosity range which indicates more preferable degree of cross-linking is 300–800 cP.

One of the ways to manufacture a polyvinyl acetal resin with inter-molecular cross-links as described above is, as disclosed in Tokko Sho-39-24711, to let the inter-molecular acetal reaction occur, i.e. to generate inter-molecular cross-links, as well as the inner-molecular acetal reaction.

It is also possible to easily obtain polyvinyl acetal resins with inter-molecular cross-links by using an amount of aldehyde greater, by 10–200 mole %, than that corresponding to the degree of acetalization of the polyvinyl acetal resin obtained, or by adding more acid catalyst than usual, for the acetalization reaction of the polyvinyl alcohol.

If the amount of excess aldehyde is 10 mole % or less, then the cross linking reaction between molecules hardly proceeds and it may not be possible to improve the sound insulation performance over a wide range. On the other hand, if it is 200 mole % or more, then there are a number of undesirable results, such as the formation of gels during synthesis of the polyvinyl acetal resin, a reduction in the reaction ratio of the aldehyde, and/or difficulty in dealing with unreacted aldehyde. More preferably, an aldehyde excess of 15–50 mole % over the degree of acetalization is used.

Also, a process in which the inter-molecular cross linking is conducted by adding a small amount of multifunctional aldehyde is preferably used. For multifunctional aldehyde, glutar aldehyde, 4,4'-(ethylenedioxy) dibenzaldehyde and 2-hydroxy hexane dial are preferably used. The amount of the multifunctional aldehyde added is preferably 0.001–1.0 mole %, more preferably 0.01–0.5 mole %, of the molar percentage of the hydroxyl of the polyvinyl alcohol.

Also, for the polyvinyl acetal (A) for the interlayer films of this invention, those with a narrow distribution of the degree of acetalization, such as, for example, a polyvinyl acetal resin which has 90% or more of the distribution of the degree of acetalization within the range between −2 mole % and 2 mole % from the average value of the degree of acetalization, are preferably used.

By using polyvinyl acetal resins with such a narrow distribution of the degree of acetalization, it is possible to obtain an interlayer film which has a far superior sound insulation performance in a certain temperature range compared with conventional sound insulating interlayer films. This interlayer film can pass Ts-40 of the JIS sound insulation grades.

Polyvinyl acetal resins with the narrow distribution of the degree of acetalization as mentioned above can be obtained by making the temperature low, preferably 5° C. or lower, when adding aldehyde and the catalyst(s) to the polyvinyl alcohol solution. It is also effective to reduce the initial amount of the catalyst(s) to, for example, 60 wt % of the normal amount. In some cases, the rest of the catalyst(s) is slowly and gradually added over, for example, 30 minutes to 3 hours.

Another method is to use several solvents with different polarities and separate, by a certain range in the degree of acetalization, and extract each synthesized polyvinyl acetal resin with a narrow distribution of the degree of acetalization.

In addition, for the polyvinyl acetal (A) for the interlayer films of this invention, those with a broad distribution of the degree of acetalization, such as, for example, a polyvinyl acetal resin which has 10–30% of the distribution of the degree of acetalization within the range −10 mole % or lower or 10 mole % or higher than the average value of the degree of acetalization, are preferably used.

An interlayer film comprising a polyvinyl acetal resin with such a broad distribution of the degree of acetalization can pass Ts-30 of the JIS sound insulation grades in the range from −10° C. to 80° C.

Polyvinyl acetal resins with the broad distribution of the degree of acetalization mentioned above can be obtained by dissolving polyvinyl alcohol in hot water, keeping the resulting aqueous solution at an appropriate temperature, 20° C. for example, adding the aldehyde and the catalyst(s) to it, and letting the acetalization reaction proceed. Another process is to make the initial amount of the aldehyde added to the polyvinyl alcohol solution mentioned above 40 wt % or less of the total added amount, and then, after keeping the reaction solution at the required temperature, add the rest of the aldehyde slowly and gradually over 30 minutes to 3 hours, for example.

In some cases, methods such as mixing two or more polyvinyl acetal resins with different average degrees of acetalization, increasing the amount of the catalyst(s) used, and/or making the temperature rising rate very fast after the addition of aldehyde and the catalysts(s) may be effective.

The distribution of the degree of acetalization of polyvinyl acetal resins can be measured by methods such as liquid chromatography and thin layer chromatography.

Now, the plasticizer(s) added to polyvinyl acetal resins (A) and (B) is described below.

For the plasticizer in this invention, organic plasticizers such as monobasic esters and polybasic esters, and phosphate plasticizers such as organic phosphates and organic phosphites are used.

Of monobasic esters, glycol esters obtained through the reaction between triethylene glycol and organic acids, such as butyric acid, isobutyric acid, capronic acid, 2-ethyl butyric acid, heptanoic acid, n-octylic acid, 2-ethylhexylic acid, peralgonic acid (n-nonylic acid) and decylic acid are preferable. In addition, esters between tetra ethylene glycol or tripropylene glycol and such organic acids as those mentioned above are also used.

For the polybasic esters, esters between organic acids such as adipic acid, sebacic acid and azelaic acid, and straight chain or branched alcohols with a carbon number of 4–8 are preferable.

For the phosphate plasticizers, tributoxy ethyl phosphate, isodecyl phenyl phosphite, triisopropyl phosphate, etc., are preferable.

More preferred examples among monobasic esters are triethylene glycol-di-2-ethyl butylate, triethylene glycol-di-2-ethylhexoate, triethylene glycol-dicapronate, triethylene glycol-di-n-octoate, etc., and among polybasic esters are dibutyl sebacate, dioctyl azelate, dibutyl carbitol adipate, etc.

The amount of the plasticizer added for layer (A) is preferably 30–70 weight parts for 100 weight parts of the polyvinyl acetal resin in layer (A). If the amount of the plasticizer added is less than 30 weight parts, then sufficient sound insulation cannot be achieved, and if it exceeds 70 weight parts, then the plasticizer may bleed out and compromise the transparency of the laminated glass and/or the adhesion between the interlayer film and the glass plates. A more preferable amount to add is 35–65 weight parts.

The amount of the plasticizer added for the layer (B) is preferably 25–55 weight parts for 100 weight parts of the polyvinyl acetal resin in layer (B). If the amount of the plasticizer added is less than 25 weight parts, then penetration resistance decreases, and if it exceeds 55 weight parts, then the plasticizer may bleed out and compromise the transparency of the laminated glass and/or the adhesion between the interlayer film and the glass plates. A more preferable amount to add is 30–45 weight parts.

For the interlayer films of this invention, an ultraviolet light absorbent (i) normally used for improving the weather resistance of each polyvinyl acetal resin layer, an additive(s) (ii) normally used to adjust the adhesion strength between the resin films and the glass plates, a stabilizer (iii) for prevention of deterioration of polyvinyl acetal, an ultraviolet light stabilizer (iv) for improving the stability of the resin layers against ultraviolet light, an antioxidant (v) for improving the thermal stability of the resin layers, etc. are added as necessary when mixing the polyvinyl acetal and the plasticizer, or when making the polyvinyl acetal.

For the sixth interlayer film, in order to improve the weather resistance of the polyacetal resin of the layer (A), as described above, at least the outmost layer on the side which needs to be weather-resistant, of the laminated layers, comprises the layer (B) which contains an ultraviolet light absorbent with an effective ultraviolet light absorption wave length of 300–340 nm so that the ultraviolet light absorption coefficient is 0.01 or more.

Ultraviolet light absorbents which have an upper limit of the effective ultraviolet light absorption wave length of 340 nm or less do not give enough weather resistance, and therefore such ultraviolet light absorbents are not preferable.

(i) Ultraviolet light absorbents are classified into the benzotriazoles, the benzophenones, the cyanoacrylates, etc.

Examples of the benzotriazole ultraviolet light absorbents are 2-(2'-hydroxy-5'-methyphenyl) benzotriazole, 2-(2'-hydroxy-5'-t-butylphenyl) benzotriazole, 2-(2'-hydroxy-3',5'-di-t-butylphenyl) benzotriazole, 2-(2,- hydroxy-3'-t-butyl-5'-methyphenyl)-5-chlorobenzotriazole, 2-(2'-hydroxy-3',5'-di-t-butylphenyl)-5-chlorobenzotriazole, 2-(2'-hydroxy-3',5'-di-t-amylphenyl) benzotriazole, 2-[2'-hydroxy-3'-(3'',4'',5'',6''-tetrahydrophthalimidomethyl)-5'-methylphenyl]benzotriazole, etc.

Examples of the benzophenone ultraviolet light absorbents are 2,4-dihydroxy benzophenone, 2-hydroxy-4-methoxy benzophenone, 2-hydroxy-4-octoxy benzophenone, 2-hydroxy-4-dodecyloxy benzophenone, 2,2'-dihydroxy-4-methoxy benzophenone, 2,2'-dihydroxy-4,4'-dimethoxy benzophenone, 2-hydroxy-4-methoxy-5-sulfon benzophenone, etc.

Example of the cyanoacrylate ultraviolet light absorbents are 2-ethylhexyl-2-cyano-3,3'-diphenylacrylate, ethyl-2-cyano-3,3'-diphenylacrylate, etc.

The amount of the ultraviolet light absorbent added is preferably such a value that the ultraviolet light absorption coefficient X, defined as {film thickness t (nun) of the layer (B) used as the outmost layer on the side which needs to be weather-resistant}×{parts u (weight parts) of the ultraviolet light absorbent added}, is 0.01 (weight part-mm) or more.

However, for the sixth interlayer film, the amount of the ultraviolet light absorbent added must be such a value that the ultraviolet light absorption coefficient X, as defined above, is 0.01 (weight part-m m) or more.

If the ultraviolet light absorption coefficient X is less than 0.01 (nun-part), then sufficient weather resistance may not be achieved. A more preferable amount of the ultraviolet light absorbent added is such a value that the ultraviolet light absorption coefficient X is 0.02 or more. Also, the amount of the ultraviolet light absorbent added is preferably 0.01–5 weight parts for 100 weight parts of the polyvinyl acetal resin. If this amount added is less than 0.01 weight parts, then sufficient weather resistance may not be achieved, and if it is 5 weight parts or more, then the strength of the interlayer film decreases and the total light transmittance of the laminated glass decreases, and therefore the basic functions as an interlayer film for laminated glass may be compromised.

(ii) For the additives, metallic salts of carboxylic acids, such as alkali metallic salts with potassium, sodium and such, or alkali earth metallic salts with calcium, magnesium and such, or salts with zinc, cobalt, etc., of octylic acid, hexylic acid, butyric acid, acetic acid, formic acid, etc. are used.

(iii) For the stabilizers, surfactants, such as sodium lauryl sulfate and alkyl benzen sulfonic acid, are preferably used.

(iv) For the ultraviolet light stabilizers, hindered amine or metallic complex salt type ultraviolet light stabilizers are preferably used.

Examples of hindered amines are his (2,2,6,6-tetramethyl-4-piperidyl) sebacate, tetrakis(2,2,6,6-tetramethyl-4-piperidyl) 1,2,3,4- butanetetracarboxylate, Sanol LS-770, Sanol LS-765, Sanol LS-2626, Chimassob 944 LD, Thinuvin-662, Thinuvin-622 LD, Mark LA-57, Mark LA-77, Mark LA-62, Mark LA-67, Mark LA-63, Mark LA-68, Mark LA-82, Mark LA-87 and Goodrite UV-3404.

Examples of ultraviolet light stabilizers of metallic complex salt type are nickel [2,2'-thiobis (4-t-octyl) phenolate]-n-butyl amine, nickel dibutyl dithiocarbamate, nickel bis [o-ethyl-3,5-(di-t-butyl-4-hydroxybenzyl)]phosphate, cobalt dicyclohexyl dithio phosphate and [1-phenyl-3-methyl-4-decanonyl-pyrazolate(5)$_2$-]nickel.

The amount of the ultraviolet light stabilizer added is preferably 0.01–3 weight parts. If the amount added is 0.01 weight parts or less, then a sufficient stabilizing effect cannot be achieved, and if it is 3 weight parts or more, then a reduction in the total light transmittance of the laminated glass and/or deterioration of the physical properties of the interlayer film may occur. A more preferable amount of the ultraviolet light stabilizer added is 0.1–1.5 weight parts.

(v) Examples of antioxidants are phenol, sulfur and phosphorus types. More preferably used are 2,6-di-t-butyl-p-cresol (BHT), butylated hydroxy anizole (BHA), 2,6-di-t-butyl-4-ethyl phenol, stearyl-beta- (3,5-di-t-butyl-4-hydroxyphenyl) propionate, 2,2'-methylene-bis-(4-methyl-6-butylphenol), 2, 2'-methylene-bis-(4-ethyl-6-t-butylphenol), 4, 4,-thiobis-(3-methyl-6-t-butylphenol), 4,4'-butylidene-bis-(3-methyl-6-t-butylphenol), 1,1,3-tris-(2-methyl-hydroxy-5-t-butylphenyl) butane, tetrakis [methylene-3-(3',5'-butyl-4'-hydroxyphenyl) propionate]methane, 1,1,3-tris-(2-methyl-4-hydroxy-5-t-butylphenol) butane, 1,3,5-trimethyl-2,4,6-tris (3,5-di-t-butyl-4-hydroxybenzil) benzene and his (3,3'-bis-(4'-hydroxy-3'-t-butylphenol) butyric acid) glycol ester.

The amount of the antioxidant added is preferably 0.05–3 weight parts. If the amount of the antioxidant added is less than 0.05 weight parts, then sufficient oxidation prevention cannot be achieved, and if it is 3 weight parts or more, then a reduction in the total light transmittance and/or deterioration of the physical properties of the interlayer film may occur. A more preferable amount of the antioxidant added is 0.2–1.5 weight parts.

Now, the lamination configuration of the interlayer films of this invention is described below.

Examples of the lamination configuration are listed below:

(1) A two-layer configuration of layer (A)/layer (B), (2) A three-layer configuration of layer (A)/layer (B)/layer (A), layer (B)/layer (A)/layer (B), etc., and (3) A four-layer configuration of layer (B)/layer (A)/layer (B)/layer (A) and such.

For the multi-layer configuration with 3 layers or more, as listed above, the lamination configuration can be asymmetric, such as/layer (A)/layer (B)/layer (B).

Also, the interlayer film of this invention can be a lamination which includes the layer (C) which does not damage characteristics of the interlayer film for laminated glass by migration of the plasticizer, such as a polyethylene terephthalate film with no decoration or with decorative printing. The examples of the lamination configuration for such interlayer films are listed below:

(4) A three-layer configuration of layer (A)/layer (C)/layer (B) and such, and (5) A four-layer configuration of layer (B)/layer (C)/layer (B)/layer (A), layer (B)/layer (A)/layer (C)/layer (A), etc.

Of the layers which constitute the interlayer film for laminated glass, at least the outmost layers on both sides are preferably the layers (B). With this arrangement, conventional technology can be used without changes for laminating the glass plates and the interlayer film.

When it is desirable to have higher weather resistance on one side than on the other, for example in the case of the interlayer films for automobile windshield glass and building windows, it is preferable that the outmost layer on the side which needs to be weather resistant is the layer (B) which contains an ultraviolet light absorbent with an effective ultraviolet light absorption wave length of 300–340 nm, the amount of the absorbent being such that the ultraviolet light absorption coefficient is 0.01 or more.

However, for the sixth interlayer film, the outmost layer on the side which needs to be weather resistant must be the layer (B) which contains an ultraviolet light absorbent with the effective ultraviolet light absorption wave length described above, the amount of the absorbent being such that the ultraviolet light absorption coefficient is 0.01 or more.

For the thicknesses of the layers (A) and (B), the total thickness of layer (A) is preferably 0.05 mm or more. If it is less than 0.05 mm, then it is not sufficient for sound insulation.

The thickness of the entire interlayer film is preferably 0.3–1.6 mm, which is the thickness of a normal interlayer film for laminated glass.

The greater the thickness, the superior the sound insulation performance. However, it is preferable to determine the thickness in consideration of the penetration resistance necessary for laminated glass, and the thickness range mentioned above is preferable for practical use.

For the film forming process, a variety of forming processes can be used, such as forming each layer separately and then laminating them between the glass plates, or using a multi-layer forming machine to form the layers as one film.

In order to manufacture laminated glass by sandwiching the interlayer film between the glass plates, conventional processes for manufacturing laminated glass are used. For example, a process in which the film is held between the glass plates and the laminated glass is manufactured by using a thermocompression press is used.

Also, sandwiching the interlayer film of this invention with transparent bodies other than glass, for example, transparent bodies with a higher rigidity than this plasticized polyvinyl acetal, such as a polycarbonate resin, does not exceed the scope of this patent.

Since the first interlayer film for laminated glass of this invention comprises laminated layers of at least one layer (A) which comprises the plasticized polyvinyl acetal resin for which the number of carbon atoms of the acetal group is 4, 5 or 6 and the residual acetyl group amount is 8–30 mole %, and at least one layer (B) which comprises the plasticized polyvinyl acetal resin for which the number of carbon atoms of the acetal group is 3 or 4 and the residual acetyl group amount is 4 mole % or less, acoustic energy is efficiently converted to thermal energy and absorbed, and in particular, reduction of the sound insulation performance by the coincidence effect in the middle-high range around 2000 Hz is effectively prevented. Therefore, the TL value can be increased by mitigation of the coincidence effect and thus a superior sound insulation performance can be achieved without compromising basic characteristics necessary for laminated glass, such as transparency, weather resistance, shock energy absorption, adhesion at resin layer interfaces, adhesion with glass, etc.

For the second interlayer film for laminated glass of this invention, the polyvinyl acetal resin in layer (A) has a standard deviation sigma of the amount of the ethylene groups bonded to acetyl groups of 0.8 or less, and therefore laminated glass which has a maximum sound insulation temperature around room temperature as well as a large maximum value for its sound insulation performance can be obtained.

For the third interlayer film for laminated glass of this invention, the polyvinyl acetal resin in layer (A) has a standard deviation sigma of the amount of the ethylene groups bonded to acetyl groups of 2.5–8, and therefore laminated glass which has a wide range for its maximum sound insulation temperature as well as a large maximum value for its sound insulation performance can be obtained.

For the fourth interlayer film for laminated glass of this invention, the polyvinyl acetal resin in layer (A) has a molecular weight distribution ratio (weight average molecular weight Mw/number average molecular weight Mn) of 1.01–1.50, and therefore laminated glass which shows a superior sound insulation performance, exceeding grade Ts-35 according to JIS A4706, can be obtained.

For the fifth interlayer film for laminated glass of this invention, the polyvinyl acetal resin in layer (A) has a molecular weight distribution ratio (weight average molecular weight Mw/number average molecular weight Mn) of 3.5–20, and therefore laminated glass which shows a good sound insulation performance over a wide temperature range can be obtained.

For the sixth interlayer film for laminated glass of this invention, of a plurality of the laminated layers, at least the outmost layer on the side which needs to be weather-resistant comprises layer (B) that contains an ultraviolet light absorbent with an effective ultraviolet light absorption wave length of 300–340 nm so that the ultraviolet light absorption coefficient is 0.01 or more, and therefore the interlayer film has superior weather resistance, and furthermore, the laminatability of the interlayer film is equivalent to that of conventional polyvinyl butyral interlayer films.

For the seventh interlayer film for laminated glass of this invention, the polyvinyl acetal resin in layer (A) is a polyvinyl acetal resin with a high degree of blocking, and therefore a superior sound insulating interlayer film which can efficiently convert acoustic energy to thermal energy over a wide temperature range can be obtained.

For the eighth interlayer film for laminated glass of this invention, the polyvinyl acetal resin in layer (A) is a highly random polyvinyl acetal resin, and therefore a superior sound insulating interlayer film with good fluidity which can efficiently convert acoustic energy to thermal energy can be obtained.

DETAILED DESCRIPTION OF THE PREFERRED EMBODIMENTS

Figure 1:
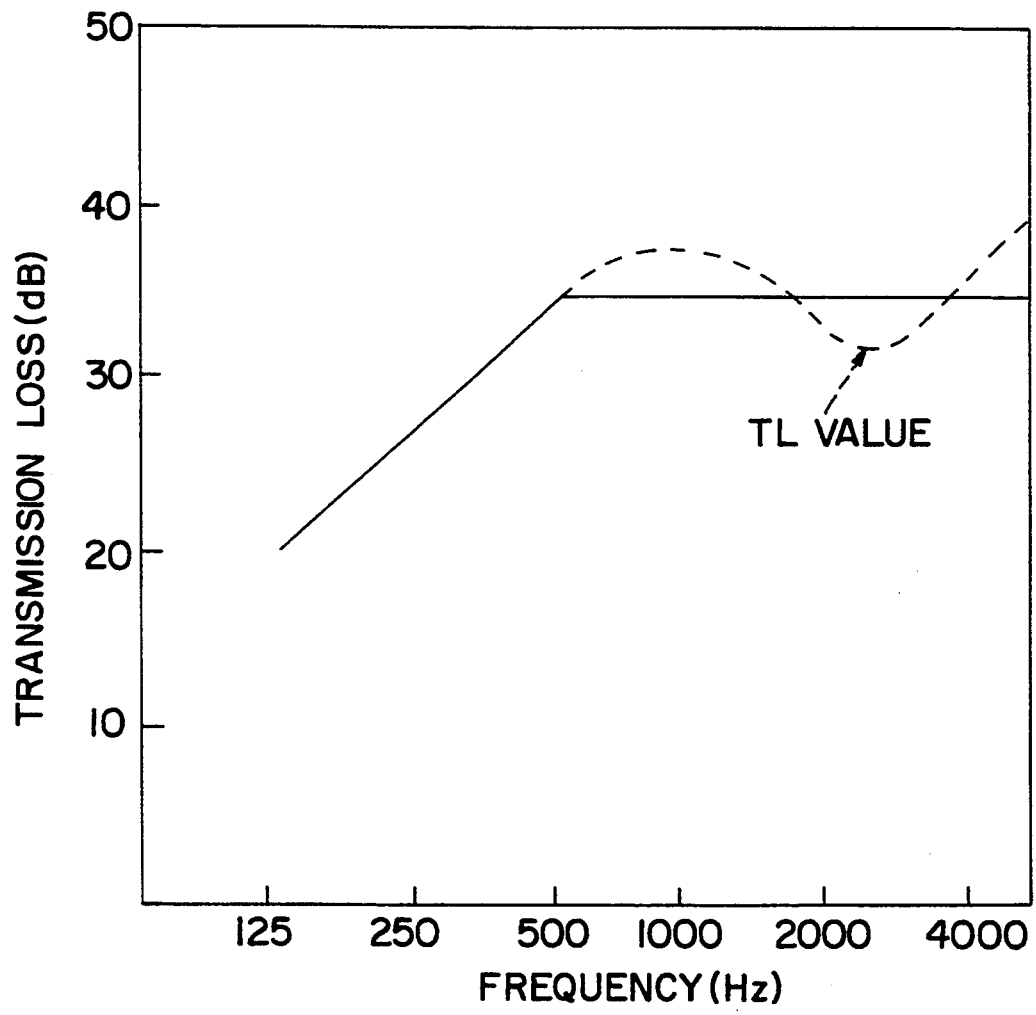
FIG. 1 is a graph which shows the sound insulation characteristics of laminated glass as frequency dependent transmission loss.

Examples for this invention and comparative examples to be compared with them are described below, and the performance of the laminated glass obtained is also shown.

The degree of acetalization of polyvinyl acetal resins was measured by preparing a 2 wt % heavy water-benzene solution of the resin, adding a small amount of tetramethylsilane [$(CH_3)_4Si$] as a standard reference material, and measuring the proton nuclear magnetic resonance spectra of the polyvinyl acetal resin at 23° C.

The average amount of the acetyl groups in polyvinyl acetal resins was measured according to the test method described in the item "Polyvinyl acetal" of the composition analysis section of the JIS "Polyvinyl acetal testing method" (K-6728-1977) mentioned above.

The distribution of the amount of ethylene groups bonded to acetyl groups was measured using the following procedure. First, the acetal groups were removed by using hydroxyl amine hydrochloride to react with the polyvinyl acetal resin, then the polyvinyl alcohol obtained was fractionated by the acetyl group amount, the amount of each fraction was determined as a weight ratio, and the amount of the acetyl groups was measured according to the test method described in the item "Vinyl acetal" of the composition analysis section of the JIS "Polyvinyl acetal testing method" (K-6728-1977) mentioned above.

The weight average molecular weight Mw, the number average molecular weight Mn, and their molecular weight distribution ratio (Mw/Mn) were determined by using the light scattering gel permeation chromatography GPC ("LS-8000 system" manufactured by Toso, column; "Polystyrene gel KF-802, KF-803 and KF-804; ID 8 mm, length 300 mm, solvent; hexafluoro isopropanol).

Fractionation of the polymer was conducted by using the GPC (LS-8000 system) mentioned above for the fractionation chromatography, the HFIP fractionation column for the column, and hexafluoro isopropanol for the solvent.

The sound insulation performance of the laminated glass was measured using the following procedure. At a prescribed temperature, the laminated glass was excited by a vibration generator (excitor "G21-005D" manufactured by Shinken Co. Ltd.), and the vibration characteristics thus obtained were amplified by a mechanical impedance amplifier ("XG-81" manufactured by Rion Co. Ltd.), and the vibration spectrum was analyzed by a FFT analyzer ("FFT spectrum analyzer HP 3582A" manufactured by Yokogawa-Hewlett-Packard, Ltd.)). The transmission loss was calculated from the loss factor thus obtained and the ratio of the resonance frequency with glass. Based on this result, the minimum transmission loss near the frequency 2000 Hz was defined as the TL value.

The evaluation of the weather resistance of laminated glass was conducted by using a Sunshine Weathermeter (according to JIS A1415) with the black panel temperature at 63° C. The transmittance (according to JIS R3212 visible light transmittance) and the degree of yellowness (according to JIS K7103) were measured. The measurement of the degree of yellowness was conducted by using a reflection type C-light source with a 2 degree visual field.

In order to determine the temperature of the maximum sound insulation performance (=TLmax temperature) and the maximum value of the sound insulation performance (=TLmax value), the transmission loss was measured at a temperature interval of 10° C., the minimum transmission loss near the frequency 2000 Hz was plotted against the temperature, and the maximum of the TL value was defined as the TLmax value, and the temperature which gives the maximum was defined as the TLmax temperature.

EXAMPLE 1

Preparation of the Resin (A)

191 g of polyvinyl alcohol with a degree of polymerization of 1700 was added to 2890 g of pure water and heat-dissolved. The temperature of this reaction system was adjusted to 12° C., and 201 g of 35 wt % hydrochloric acid and 130 g of butyl aldehyde were added to precipitate polyvinyl acetal. Then, the temperature of the reaction system was kept at 50° C. for 5 hours to complete the reaction. Unreacted aldehyde was washed away by rinsing with an excess amount of water, the hydrochloric acid catalyst was neutralized, the salt was removed, and, after the drying process, white powder of the polyvinyl acetal resin (A) was obtained.

For this polyvinyl acetal resin (A), the degree of acetalization was 60.2 mole %, and the amount of acetyl groups was 11.9 mole %.

Preparation of the Film (A)

50 g of the polyvinyl acetal (A) described above was collected, and 25 g of triethylene glycol-di-2-ethylbutylate, as the plasticizer, and 0.15 g of tetrakis [methylene-3-(3',5'-butyl-4'-hydroxylphenyl) propionate]methane, as the antioxidant, were added to it, then the mixture was thoroughly kneaded by a mixing roll(s), and a prescribed amount of the kneaded material was held in a press molding machine for 30 minutes at 150° C. Thus, the 0.20 mm thick film (A) was prepared.

Preparation of the Resin (B)

190 g of polyvinyl alcohol with a degree of polymerization of 1700 was added to 2910 g of pure water and heat-dissolved. The temperature of this reaction system was adjusted to 12° C., and 201 g of 35 wt % hydrochloric acid and 130 g of butyl aldehyde were added to precipitate polyvinyl acetal. Then, the temperature of the reaction system was kept at 50° C. for 4 hours to complete the reaction. Unreacted aldehyde was washed away by rinsing with an excess amount of water, the hydrochloric acid catalyst was neutralized, the salt was removed, and, after the drying process, white powder of the polyvinyl acetal resin (B) was obtained.

For this polyvinyl acetal resin (B), the degree of acetalization was 65.9 mole %, and the amount of acetyl groups was 0.9 mole %.

Preparation of the Film (B)

50 g of the polyvinyl acetal (B) described above was collected, and 20 g of triethylene glycol-di-2-ethylbutylate, as the plasticizer, and 0.1 g of 2-(2'-hydroxy-5'-methylphenyl) benzotriazole, as the ultraviolet light absorbent, were added to it, then the mixture was thoroughly kneaded by a mixing roll(s), and a prescribed amount of the kneaded material was held in a press molding machine for 30 minutes at 150° C. Thus, the 0.20 mm thick film (B) was prepared.

Making the Laminated Glass

A laminated interlayer film comprising three layers was obtained by laminating one film of the polyvinyl acetal resin (A) and two films of the polyvinyl acetal resin (B) in such a way that the lamination configuration is layer (B)/layer (A)/layer (B). This interlayer film was sandwiched from both sides with two sheets of float glass each of which is a 30 cm square with a 3 mm thickness, and then this unpressed sandwich was put into a rubber bag, de-aired for 20 minutes at a 20 torr vacuum, transferred to an oven at 90° C. while in a de-aired state, and kept at this temperature for 30 minutes. The sandwich thus preliminarily bonded by vacuum pressing then went through a thermocompression bonding treatment at a pressure of 12 kg/cm2 and at a temperature of 135° C. in an autoclave, and thus the transparent laminated glass was obtained.

EXAMPLES 2–7

As shown in Table 1, interlayer films comprising the polyvinyl acetal resin (A) and the polyvinyl acetal resin (B) with different degrees of acetalization, different amounts of acetyl groups, different amounts of the plasticizer added, different thicknesses of the layers, and different lamination configurations, within the scope of this invention, were prepared and laminated glass was made using them.

COMPARATIVE EXAMPLES 1–4

As shown in in Table 1, interlayer films which do not fall in the scope of this invention were prepared, and laminated glass was made using them.

Measurement of the Sound Insulation

The sound insulation at 20° C. was measured for Examples 1–7 described above and Comparative examples 1–4.

The measurement results are summarized in Table 1.

TABLE 1

| | Resin Composition (Mol %) | | | | | | Lamination Configuration | | |
| | Resin A | | | Resin B | | | | | |
| | Amount of Acetyl-groups | Degree of Acetalization | Platicizer (Wt parts) | Amount of Acetyl-groups | Degree of Acetalization | Plasticizer (Wt parts) | Lamination Thickness (mm) | Film Thickness (mm) | TL Value dB 20° C. |
|---|---|---|---|---|---|---|---|---|---|
| Ex. 1 | 11.9 | n-butyl 60.2 | 50 | 0.9 | n-butyl 65.9 | 40 | B/A/B 0.2/0.2/0.2 | 0.6 | 37 |
| Ex. 2 | 9.7 | n-hexyl 48.1 | 55 | 2.4 | n-propyl 68.8 | 40 | B/A/B 0.3/0.4/0.2 | 0.9 | 37 |
| Ex. 3 | 17.9 | n-butyl 56.2 | 45 | 0.9 | n-butyl 65.9 | 35 | B/A/B/A 0.1/0.2/0.1/0.15 | 0.55 | 37 |
| Ex. 4 | 20.1 | n-butyl 52.3 | 65 | 0.9 | n-butyl 65.9 | 40 | B/A/B 0.3/0.05/0.4 | 0.75 | 36 |
| Ex. 5 | 27.8 | n-butyl 45.6 | 40 | 0.9 | n-butyl 65.9 | 35 | A/B/A 0.1/0.3/0.2 | 0.6 | 37 |
| Ex. 6 | 14.3 | n-valer 58.2 | 55 | 2.3 | n-butyl 72.3 | 40 | B/A/B/A 0.1/0.05/0.15/0.1 | 0.4 | 37 |
| Ex. 7 | 11.9 | n-butyl 60.2 | 50 | 0.9 | n-butyl 65.9 | 45 | A/B 0.3/0.2 | 0.4 | 36 |

TABLE 1-continued

| | Resin Composition (Mol %) | | | | | | Lamination Configuration | | |
|---|---|---|---|---|---|---|---|---|---|
| | Resin A | | | Resin B | | | | | |
| | Amount of Acetyl-groups | Degree of Acetalization | Platicizer (Wt parts) | Amount of Acetyl-groups | Degree of Acetalization | Plasticizer (Wt parts) | Lamination Thickness (mm) | Film Thickness (mm) | TL Value dB 20° C. |
| Comp. Ex. 1 | | | | 0.9 | n-butyl 65.9 | 40 | B 0.76 | 0.76 | 29 |
| Comp. Ex. 2 | 11.9 | n-butyl 60.2 | 40 | | | | A 0.76 | 0.76 | 33 |
| Comp. Ex. 3 | 5.7 | n-butyl 57.3 | 40 | 0.9 | n-butyl 65.9 | 40 | A/B/A 0.25/0.25/0.25 | 0.75 | 33 |
| Comp. Ex. 4 | 11.8 | n-octyl 50.2 | 40 | 2.4 | n-butyl 66.3 | 40 | B/A/B 0.2/0.3/0.2 | 0.7 | 32 |

Ex. = Example
Comp. Ex. = Comparative Example

As clearly shown in Table 1, each laminated glass of this invention has a superior sound insulation performance.

EXAMPLE 8

Preparation of the Resin (A)

180 g of polyvinyl alcohol (manufactured by The Nippon Synthetic Chemical Industry, Co., Ltd.) with an average acetyl group amount of 12.3 mole %, a standard deviation, $\sigma$, of the amount of ethylene groups bonded to acetyl groups of 0.5, and a degree of polymerization of 1700 was added to 2890 g of pure water and heat-dissolved. The temperature of this reaction system was adjusted to 12° C., and 200 g of 35 wt % hydrochloric acid and 135 g of butyl aldehyde were added to precipitate polyvinyl acetal. Then, the temperature of the reaction system was kept at 45° C. for 4 hours to complete the reaction. Unreacted aldehyde was washed away by rinsing with an excess amount of water, the hydrochloric acid catalyst was neutralized, the salt was removed, and, after the drying process, white powder of the polyvinyl acetal resin (A) was obtained.

For this polyvinyl acetal resin (A), the degree of acetalization was 64.3 mole %, the amount of acetyl groups was 12.3 mole %, and the standard deviation, $\sigma$, sigma of the amount of ethylene groups bonded to acetyl groups was 0.5.

Preparation of Film (A)

50 g of the polyvinyl acetal (A) described above was collected, and 25 g of triethylene glycol-di-2-ethylbutylate, as the plasticizer, and 0.05 g of 2-(2′-hydroxy-5′-methylphenyl) benzotriazole, as the ultraviolet light absorbent, and 0.05 g of BHT, as the antioxidant, were added to it, then the mixture was thoroughly kneaded by a mixing roll(s), and a prescribed amount of the kneaded material was held in a press molding machine for 30 minutes at 150° C. Thus, the 0.40 mm thick film (A) was prepared.

Preparation of the Resin (B)

Using the same procedure as for the preparation of the resin (B) of Example 1, white powder of the polyvinyl acetal resin (B) with a degree of acetalization of 66.3 mole %, an amount of acetyl groups of 0.9 mole %, and a standard deviation, $\sigma$, of the amount of ethylene groups bonded to acetyl groups of 0.3 was obtained.

Preparation of the Film (B)

Using the same procedure as for the preparation of the film (B) of Example 1, the polyvinyl acetal (B) described above was formed into the film (B) with a thickness of 0.10 mm.

Making the Laminated Glass

Using the same procedure as for making the laminated glass of Example 1, the transparent laminated glass was made.

EXAMPLES 9-11

As shown in Table 2, interlayer films comprising the polyvinyl acetal resin (A) and the polyvinyl acetal resin (B) with different degrees of acetalization, different amounts of acetyl groups, different standard deviation sigmas, different amounts of the plasticizer added, different thicknesses of the layers, and different lamination configurations, within the scope of this invention, were prepared and laminated glass was made using them.

COMPARATIVE EXAMPLES 5-6

As shown in Table 2, interlayer films which do not fall in the scope of this invention were prepared, and laminated glass was made using them.

Measurement of the Sound Insulation

The sound insulation at prescribed temperatures was measured for Examples 8-11 described above and Comparative examples 5-6.

The measurement results are summarized in Table 2.

TABLE 2

| | Resin Composition (Mol %) | | | | | | | Lamination Thickness (mm) | | TL | |
|---|---|---|---|---|---|---|---|---|---|---|---|
| | Resin A | | | | Resin B | | | | | Max | |
| | Amount of Acetyl-groups | | Degree of Acetalization | Platicizer (Wt parts) | Amount of Acetyl-groups | | Degree of Acetalization | Plasticizer (Wt parts) | Lamination Thickness (mm) | Value (dB) | Temperature °C. |
| Ex. 8 | 12.3 | 0.5 | n-butyl 64.3 | 50 | 0.9 | 0.3 | n-butyl 66.3 | 40 | B/A/B 0.1/0.4/0.1 | 40 | 22 |
| Ex. 9 | 24.7 | 0.4 | n-butyl 53.4 | 40 | 0.6 | 0.2 | n-hexyl 69.5 | 35 | A/B/A 0.2/0.1/0.3 | 39 | 25 |

TABLE 2-continued

| | Resin Composition (Mol %) | | | | | | | Lamination Thickness (mm) | TL | |
|---|---|---|---|---|---|---|---|---|---|---|
| | Resin A | | | | Resin B | | | | | Max |
| | Amount of Acetyl-groups | Degree of Acetalization | Platicizer (Wt parts) | | Amount of Acetyl-groups | Degree of Acetalization | Plasticizer (Wt parts) | Lamination Thickness (mm) | Value (dB) | Temperature °C. |
| Ex. 10 | 11.9 | 0.7 | n-hexyl | 35 | 0.9 | 0.3 | n-butyl | 45 | B/A/B | 39 | 24 |
| | | | 54.7 | | | | 66.3 | | 0.2/0.1/0.3 | | |
| Ex. 11 | 19.9 | 0.5 | n-pentyl | 40 | 0.9 | 0.3 | n-butyl | 40 | B/A | 40 | 23 |
| | | | 50.2 | | | | 66.3 | | 0.4/0.5 | | |
| Comp. Ex. 5 | 0.4 | 1.4 | n-butyl 65.4 | 40 | | | | 40 | 0.9 | 37 | 41 |
| Comp Ex. 6 | 6.4 | 3.5 | n-hexyl | 45 | 0.9 | 0.3 | n-butyl | 45 | B/A/B | 36 | 24 |
| | | | 62.1 | | | | 66.3 | | 0.2/0.4/0.2 | | |

Ex. = Example
Comp. Ex. = Comparative Example

As clearly shown in Table 2, each laminated glass of this invention has a superior sound insulation performance around room temperature.

EXAMPLE 12

Preparation of the Resin (A)

191 g of polyvinyl alcohol (manufactured by The Nippon Synthetic Chemical Industry, Co., Ltd.) with an average acetyl group amount of 11.8 mole %, a standard deviation sigma of the amount of ethylene groups bonded to acetyl groups of 3.4, and a degree of polymerization of 1700 was added to 2890 g of pure water and heat-dissolved. The temperature of this reaction system was adjusted to 12° C., and 201 g of 35 wt % hydrochloric acid and 130 g of butyl aldehyde were added to precipitate polyvinyl acetal. Then, the temperature of the reaction system was kept at 45° C. for 4 hours to complete the reaction. Unreacted aldehyde was washed away by rinsing with an excess amount of water, the hydrochloric acid catalyst was neutralized, the salt was removed, and, after the drying process, white powder of the polyvinyl acetal resin (A) was obtained.

For this polyvinyl acetal resin (A), the degree of acetalization was 61.3 mole %, the amount of acetyl groups was 11.8 mole %, and the standard deviation, σ, of the amount of ethylene groups bonded to acetyl groups was 3.4.

Preparation of the Film (A)

50 g of the polyvinyl acetal (A) described above was collected, and 22.5 g of triethylene glycol-di-2-ethylbutylate, as the plasticizer, and 0.05 g of 2-(2'-hydroxy-5'-methylphenyl) benzotriazole, as the ultraviolet light absorbent, and 0.05 g of BHT, as the antioxidant, were added to it, then the mixture was thoroughly kneaded by a mixing roll(s), and a prescribed amount of the kneaded material was held in a press molding machine for 30 minutes at 150° C. Thus, the 0.15 mm thick film (A) was prepared.

Preparation of the Resin (B)

Using the same procedure as for the preparation of the resin (B) of Example 1, white powder of the polyvinyl acetal resin (B) with a degree of acetalization of 66.3 mole %, an amount of acetyl groups of 0.9 mole %, and a standard deviation sigma of the amount of ethylene groups bonded to acetyl groups of 0.3 was obtained.

Preparation of the film (B)

Using the same procedure as for the preparation of the film (B) of Example 1, the polyvinyl acetal (B) described above was formed into the film (B) with a thickness of 0.10 mm.

Making the Laminated Glass

Using the same procedure as for making the laminated glass of Example 1, the transparent laminated glass was made.

EXAMPLES 13-16

As shown in Table 3, interlayer films comprising the polyvinyl acetal resin (A) and the polyvinyl acetal resin (B) with different degrees of acetalization, different amounts of acetyl groups, different standard deviation, σ, different amounts of the plasticizer added, different thicknesses of the layers, and different lamination configurations, within the scope of this invention, were prepared and laminated glass was made using them.

COMPARATIVE EXAMPLES 7-8

As shown in Table 3, interlayer films which do not fall within the scope of this invention were prepared, and laminated glass was made using them.

Measurement of the Sound Insulation

The sound insulation at prescribed temperatures was measured for Examples 12-16 described above and Comparative examples 7-8.

The measurement results are summarized in Table 3.

TABLE 3

| | Resin Composition (Mol %) | | | | | | | Lamination Thickness (mm) | TL Value (dB) | | | |
|---|---|---|---|---|---|---|---|---|---|---|---|---|
| | Resin A | | | | Resin B | | | | | | | |
| | Amount of Acetyl-groups | Degree of Acetylization | Platicizer (Wt parts) | | Amount of Acetyl-groups | Degree of Acetalization | Plasticizer (Wt parts) | Lamination Thickness (mm) | 10° C. | 20° C. | 30° C. | 40° C. |
| Ex. 12 | 11.8 | 3.4 | n-butyl | 45 | 0.9 | 0.3 | n-butyl | 40 | B/A/B | 34 | 37 | 36 | 32 |
| | | | 61.3 | | | | 66.3 | | 0.18/0.15/0.18 | | | | |
| Ex. 13 | 21.3 | 5.2 | n-butyl | 45 | 0.9 | 0.3 | n-butyl | 40 | B/A/B | 35 | 37 | 36 | 32 |
| | | | 55.4 | | | | 66.3 | | 0.1/0.2/0.1 | | | | |

TABLE 3-continued

| | Resin Composition (Mol %) | | | | | | Lamination | TL | | | |
|---|---|---|---|---|---|---|---|---|---|---|---|
| | Resin A | | | Resin B | | | Thickness (mm) | Value (dB) | | | |
| | Amount of Acetyl-groups | Degree of Acetylization | Platicizer (Wt parts) | Amount of Acetyl-groups | Degree of Acetalization | Plasticizer (Wt parts) | Lamination Thickness (mm) | 10° C. | 20° C. | 30° C. | 40° C. |
| Ex. 14 | 12.1 | 2.7 n-hexyl 53.2 | 40 | 0.9 | 0.3 n-butyl 63.3 | 45 | A/B/A 0.2/0.2/0.2 | 36 | 37 | 35 | 34 |
| Ex. 15 | 11.8 | 3.4 n-butyl 61.3 | 55 | 0.6 | 0.2 n-hexyl 63.4 | 35 | B/A/B 0.2/0.4/0.2 | 36 | 37 | 35 | 34 |
| Ex. 16 | 27.5 | 4.8 n-pentyl 50.7 | 45 | 0.9 | 0.3 n-butyl 66.3 | 40 | B/A 0.2/0.3 | 35 | 37 | 35 | 33 |
| Comp. Ex. 7 | 1.3 | 0.5 n-butyl 65.4 | 40 | | | 40 | A 0.6 | 24 | 29 | 35 | 36 |
| Comp. Ex. 8 | 5.7 | 3.5 n-butyl 55.3 | 45 | 0.9 | 0.3 n-butyl 66.3 | 45 | B/A/B 0.25/0.2/0.25 | 28 | 31 | 36 | 37 |

Ex. = Example
Comp. Ex. = Comparative Example

As clearly shown in Table 3, each laminated glass of this invention has a superior sound insulation performance in a wide temperature range.

EXAMPLE 17

Preparation of the Resin (A)

Using the same procedure as for the preparation of the resin (A) of Example 1, white powder of the polyvinyl acetal resin (A) with a degree of acetalization of 60.2 mole %, and an amount of acetyl groups of 11.9 mole % was obtained.

This polymer was dissolved into 2 liters of hexafluoro isopropanol, fractionation was conducted using the GPC (LS-8000 system) mentioned above, and the polyvinyl acetal resin (A) with a number average molecular weight of 160,000 and a molecular weight distribution ratio (Mw/Mn) of 1.02 was obtained.

Preparation of the Film (A)

Using the same procedure as for the preparation of film (A) of Example 1, the polyvinyl acetal (A) described above was formed into the film (A) with a thickness of 0.20 mm.

Preparation of the Resin (B)

Using the same procedure as for the preparation of the resin (B) of Example 1, white powder of the polyvinyl acetal resin (B) with a degree of acetalization of 65.9 mole % and an amount of acetyl groups of 0.9 mole % was obtained.

Preparation of the Film (B)

Using the same procedure as for the preparation of the film (B) of Example 1, the polyvinyl acetal (B) described above was formed into the film (B) with a thickness of 0.20 mm.

Making the Laminated Glass

Using the same procedure as for making the laminated glass of Example 1, the transparent laminated glass was made.

EXAMPLES 18-23

As shown in Table 4, interlayer films comprising the polyvinyl acetal resin (A) and the polyvinyl acetal resin (B) with different degrees of acetalization, different amounts of acetyl groups, different number average molecular weights Mn and molecular weight distribution ratios (Mw/Mn), different amounts of the plasticizer added, different thicknesses of the layers, and different lamination configurations, within the scope of this invention, were prepared and laminated glass was made using them.

COMPARATIVE EXAMPLES 9-11

As shown in Table 4, interlayer films which do not fall within the scope of this invention were prepared, and laminated glass was made using them.

Measurement of the Sound Insulation

The sound insulation at prescribed temperatures was measured for Examples 17-23 described above and Comparative examples 9-11.

The measurement results are summarized in Table 4-1 and Table 4-2.

TABLE 4

| | Resin Composition (Mol %) | | | | | | | |
|---|---|---|---|---|---|---|---|---|
| | Resin A | | | | | Resin B | | |
| | Amount of Acetylgroups | Degree of Acetalization | Mn | Mw/Mn | Platicizer (Wt parts) | Amount of Acetylgroups | Degree of Acetalization | Plasticizer (Wt parts) |
| Ex. 17 | 11.9 | n-butyl 60.2 | 160,000 | 1.02 | 50 | 0.9 | n-butyl 65.9 | 40 |
| Ex. 18 | 9.7 | n-hexyl 48.1 | 200,000 | 1.02 | 55 | 2.4 | n-propyl 68.8 | 40 |
| Ex. 19 | 17.9 | n-butyl 56.2 | 164,000 | 1.02 | 45 | 0.9 | n-butyl 65.9 | 35 |
| Ex. 20 | 20.1 | n-butyl 52.3 | 160,000 | 1.40 | 65 | 0.9 | n-butyl 65.9 | 40 |
| Ex. 21 | 27.8 | n-butyl 45.6 | 210,000 | 1.20 | 40 | 0.9 | n-butyl 65.9 | 35 |
| Ex. 22 | 14.3 | n-valer 58.2 | 200,000 | 1.23 | 55 | 2.3 | n-butyl 72.3 | 40 |
| Ex. 23 | 11.9 | n-butyl | 164,000 | 1.32 | 50 | 0.9 | n-butyl | 40 |

TABLE 4-continued

| | | | | | | | | |
|---|---|---|---|---|---|---|---|---|
| Comp. Ex. 9 | | 60.2 | | | | 0.9 | 65.9 n-butyl 65.9 | 40 |
| Comp. Ex. 10 | 5.7 | n-butyl 57.3 | 160,000 | 1.20 | 40 | 0.9 | 65.9 n-butyl 65.9 | 40 |
| Comp. Ex. 11 | 11.8 | n-ocyl 50.2 | 168,000 | 1.20 | 40 | 2.4 | n-butyl 66.3 | 40 |

| | Lamination Configuration | | TL Value dB | Temperature Dependance of TL Value TL Value (dB) | | | |
|---|---|---|---|---|---|---|---|
| | Lamination Thickness (mm) | Film Thickness (mm) | 20° C. | 10° C. | 20° C. | 30° C. | 40° C. |
| Ex. 17 | B/A/B 0.2/0.2/0.2 | 0.6 | 41 | 32 | 41 | 32 | 24 |
| Ex. 18 | B/A/B 0.3/0.4/0.2 | 0.9 | 40 | 33 | 40 | 33 | 26 |
| Ex. 19 | B/A/B/A 0.1/0.2/0.1/0.15 | 0.55 | 41 | | | | |
| Ex. 20 | B/A/B 0.3/0.05/0.4 | 0.75 | 40 | | | | |
| Ex. 21 | A/B/A 0.1/0.3/0.2 | 0.6 | 40 | | | | |
| Ex. 22 | B/A/B/A 0.1/0.05/0.15/0.1 | 0.4 | 40 | | | | |
| Ex. 23 | A/B 0.3/0.2 | 0.4 | 40 | | | | |
| Comp. Ex. 9 | B 0.76 | 0.76 | 29 | | | | |
| Comp. Ex. 10 | A/B/A 0.25/0.25/0.25 | 0.75 | 33 | | | | |
| Comp. Ex. 11 | B/A/B 0.2/0.3/0.2 | 0.7 | 32 | | | | |

As clearly shown in Table 4, each laminated glass of this invention has a superior sound insulation performance around room temperature.

EXAMPLE 24

Preparation of the Resin (A)

Using the same procedure as for the preparation of the resin (A) of Example 1, except for the fact that the blend (blend ratio 1:1) of polyvinyl alcohol with a degree of polymerization of 500 and polyvinyl alcohol with a degree of polymerization of 3000 was used, white powder of the polyvinyl acetal resin (A) with a degree of acetalization of 59.9 mole %, and an amount of acetyl groups of 12.1 mole % was obtained.

For this polymer, the number average molecular weight Mn was 36,400 and the molecular weight distribution ratio (Mw/Mn) was 6.71.

Preparation of the Film (A)

Using the same procedure as for the preparation of the film (A) of Example 1, the polyvinyl acetal (A) described above was formed into the film (A) with a thickness of 0.20 mm.

Preparation of the Resin (B)

Using the same procedure as for the preparation of the resin (B) of Example 1, white powder of the polyvinyl acetal resin (B) with a degree of acetalization of 65.9 mole % and an amount of acetyl groups of 0.9 mole % was obtained.

Preparation of the Film (B)

Using the same procedure as for the preparation of the film (B) of Example 1, the polyvinyl acetal (B) described above was formed into the film (B) with a thickness of 0.20 mm.

Making the Laminated Glass

Using the same procedure as for making the laminated glass of Example 1, the transparent laminated glass was made.

EXAMPLES 25-30

As shown in Table 5, interlayer films comprising the polyvinyl acetal resin (A) and the polyvinyl acetal resin (B) with different degrees of acetalization, different amounts of acetyl groups, different number average molecular weights Mn and molecular weight distribution ratios (Mw/Mn), different amounts of the plasticizer added, different thicknesses of the layers, and different lamination configurations, within the scope of this invention, were prepared and laminated glass was made with them.

COMPARATIVE EXAMPLES 12-14

As shown in Table 5, interlayer films which do not fall within the scope of this invention were prepared, and laminated glass was made using them.

Measurement of the Sound Insulation

The sound insulation at prescribed temperatures was measured for Examples 24-30 described above and Comparative examples 12 -14.

The measurement results are summarized in Table 5.

TABLE 5

| Resin Composition (Mol %) | | | | | | |
|---|---|---|---|---|---|---|
| Resin A | | | | Resin B | | |
| Amount of | Degree of | | Platicizer | Amount of | Degree of | Plasticizer |

TABLE 5-continued

|  | Acetylgroups | Acetalization | Mn | Mw/Mn | (Wt parts) | Acetylgroups | Acetalization | (Wt parts) |
|---|---|---|---|---|---|---|---|---|
| Ex. 24 | 12.1 | n-butyl 59.9 | 36,400 | 6.71 | 50 | 0.9 | n-butyl 65.9 | 40 |
| Ex. 25 | 9.6 | n-hexyl 48.3 | 162,000 | 4.50 | 55 | 2.4 | propyl 68.8 | 40 |
| Ex. 26 | 16.9 | n-butyl 57.2 | 30,000 | 18.30 | 45 | 0.9 | n-butyl 65.9 | 35 |
| Ex. 27 | 20.0 | n-butyl 52.4 | 200,000 | 3.86 | 65 | 0.9 | n-butyl 65.9 | 40 |
| Ex. 28 | 28.0 | n-butyl 45.4 | 52,000 | 8.30 | 40 | 0.9 | n-butyl 65.9 | 35 |
| Ex. 29 | 14.1 | n-valer 58.4 | 120,000 | 5.62 | 55 | 2.3 | n-butyl 72.3 | 40 |
| Ex. 30 | 11.6 | n-butyl 60.5 | 32,000 | 13.20 | 50 | 0.9 | n-butyl 65.9 | 45 |
| Comp. Ex. 12 |  |  |  |  |  | 0.9 | n-butyl 65.9 | 40 |
| Comp. Ex. 13 | 5.5 | n-butyl 57.5 | 162,000 | 4.50 | 40 | 0.9 | n-butyl 65.9 | 40 |
| Comp. Ex. 14 | 12.0 | n-octyl 50.0 | 168,000 | 4.20 | 40 | 2.4 | n-butyl 66.3 | 40 |

|  | Lamination Configuration | | Film Thickness (mm) | TL Value dB | | | |
|---|---|---|---|---|---|---|---|
|  | Lamination Thickness (mm) | | | 10° C. | 20° C. | 30° C. | 40° C. |
| Ex. 24 | B/A/B 0.2/0.2/0.2 | | 0.6 | 35 | 37 | 36 | 35 |
| Ex. 25 | B/A/B 0.3/0.4/0.2 | | 0.9 | 35 | 37 | 36 | 35 |
| Ex. 26 | B/A/B/A 0.1/0.2/0.1/0.15 | | 0.55 | 36 | 36 | 36 | 35 |
| Ex. 27 | B/A/B 0.3/0.05/0.4 | | 0.75 | 35 | 37 | 36 | 35 |
| Ex. 28 | A/B/A 0.1/0.3/0.2 | | 0.6 | 35 | 37 | 36 | 35 |
| Ex. 29 | B/A/B/A 0.1/0.05/0.15/0.1 | | 0.4 | 35 | 37 | 36 | 35 |
| Ex. 30 | A/B 0.3/0.2 | | 0.4 | 36 | 36 | 36 | 35 |
| Comp. Ex. 12 | B 0.76 | | 0.76 | 24 | 29 | 34 | 36 |
| Comp. Ex. 13 | A/B/A 0.25/0.25/0.25 | | 0.75 | 27 | 32 | 35 | 37 |
| Comp. Ex. 14 | B/A/B 0.2/0.3/0.2 | | 0.7 | 27 | 33 | 35 | 37 |

Ex. = Example
Comp. Ex. = Comparative Example

As clearly shown in Table 5, each laminated glass of this invention has a superior sound insulation performance over a wide temperature range.

EXAMPLE 31

Preparation of the Resin (A)

Using the same procedure as for the preparation of the resin (A) of Example 1, white powder of the polyvinyl acetal resin (A) with a degree of acetalization of 60.2 mole %, and an amount of acetyl groups of 11.9 mole % was obtained.

Preparation of the Film (A)

Using the same procedure as for the preparation of the film (A) of Example 1, the polyvinyl acetal (A) described above was formed into the film (A) with a thickness of 0.20 mm.

Preparation of the Resin (B)

Using the same procedure as for the preparation of the resin (B) of Example 1, white powder of the polyvinyl acetal resin (B) with a degree of acetalization of 65.9 mole % and an amount of acetyl groups of 0.9 mole % was obtained.

Preparation of the film (B)

Using the same procedure as for the preparation of the film (B) of Example 1, the polyvinyl acetal (B) described above was formed into the film (B) with a thickness of 0.20 mm.

Making the Laminated Glass

Using the same procedure as for making the laminated glass of Example 1, a transparent laminated glass, the outmost layer of which was layer (B), was made.

EXAMPLES 32-33

As shown in Table 6, interlayer films comprising the polyvinyl acetal resin (A) and the polyvinyl acetal resin (B) with different degrees of acetalization, different amounts of acetyl groups, different amounts of the plasticizer added, different thicknesses of the layers, and different lamination configurations, within the scope of this invention, were prepared and laminated glass was made using them.

COMPARATIVE EXAMPLES 15-17

As shown in Table 6, interlayer films which do not fall within the scope of this invention were prepared, and laminated glass was made using them.

Measurement of the Sound Insulation

The sound insulation at a prescribed temperature was measured for Examples 31-33 described above and Comparative examples 15-17.

The measurement results are summarized in Table 6.

TABLE 6

| | Resin Composition | | | | | | Lamination Configuration | |
|---|---|---|---|---|---|---|---|---|
| | Resin A | | | Resin B | | | Lamination | Film |
| | Amount of Acetylgroups | Degree of Acetalization | Platicizer (Wt parts) | Amount of Acetylgroups | Degree of Acetalization | Plasticizer (Wt parts) | Thickness (mm) Outer Inner | Thickness (mm) |
| Ex. 31 | 11.9 | n-butyl 60.2 | 50 | 0.9 | n-butyl 65.9 | 40 | B*/A/B 0.2/0.2/0.2 | 0.6 |
| Ex. 32 | 9.7 | n-hexyl 48.1 | 55 | 2.4 | aceto 68.8 | 40 | B*/A/B 0.3/0.4/0.2 | 0.9 |
| Ex. 33 | 17.9 | n-butyl 56.2 | 45 | 0.9 | n-butyl 65.9 | 35 | B*/A/B/A 0.1/0.2/0.1/0.15 | 0.55 |
| Comp. Ex. 15 | | | | 0.9 | n-butyl 65.9 | 40 | B* 0.76 | 0.76 |
| Comp. Ex. 16 | 11.9 | n-butyl 60.2 | 40 | | | | A 0.76 | 0.76 |
| Comp Ex. 17 | 5.7 | n-butyl 57.3 | 40 | 0.9 | n-butyl 65.9 | 40 | A/B/A 0.25/0.25/0.25 | 0.75 |

| | Ultraviolet Light Absorbion Coefficient (mm · part) | TL Value dB 20° C. | Weather Resistance | | |
|---|---|---|---|---|---|
| | | | Hour Trans-mittance | 2000 Hours Trans-mittance | Degree of Yellowness |
| Ex. 31 | 0.04 | 37 | 88 | 87 | 2.2 |
| Ex. 32 | 0.06 | 37 | 87 | 86 | 2.4 |
| Ex. 33 | 0.03 | 37 | 87 | 86 | 2.5 |
| Comp. Ex. 15 | 0.2 | 29 | 89 | 88 | 2.0 |
| Comp. Ex. 16 | 0 | 33 | 88 | 84 | 4.5 |
| Comp. Ex. 17 | 0 | 33 | 88 | 85 | 4.3 |

Ex. = Example
Comp. Ex. = Comparative Example
*Weather resistant layer

As clearly shown in Table 6, each laminated glass of this invention has a superior sound insulation performance around room temperature and also has superior weather resistance.

EXAMPLE 34

Preparation of the Resin (A)

191 g of polyvinyl alcohol with a degree of polymerization of 1700 and a degree of blocking of the ethylene groups bonded to acetyl groups of 0.24 was added to 2890 g of pure water and heat-dissolved. The temperature of this reaction system was adjusted to 12° C., and 201 g of 35 wt % hydrochloric acid and 130 g of butyl aldehyde were added to precipitate polyvinyl acetal. Then, the temperature of the reaction system was kept at 50° C. for 5 hours to complete the reaction. Unreacted aldehyde was washed away by rinsing with an excess amount of water, the hydrochloric acid catalyst was neutralized, the salt was removed, and, after the drying process, white powder of the polyvinyl acetal resin (A) was obtained.

For this polyvinyl acetal resin (A), the degree of acetalization was 60.2 mole %, and the amount of acetyl groups was 11.5 mole %.

As for the definition of the degree of blocking, i.e. $Y = 0.5 \times S/(T \times U)$, S, T and U in the equation were determined by using the 13C-NMR chart(s) of the polyvinyl alcohol as follows. Three peaks attributable to methylene groups appear at 42.5 ppm. These peaks correspond to, from the high field side, the methylene group in the —CH(OCOCH$_3$)—CH$_2$—(OCOCH$_3$)-CH— structure (methylene 1), the methylene group in the —CH(OH)—CH$_2$—(OCOCH$_3$)CH— structure (methylene 2), and the methylene group in the —CH(OH)—CH$_2$—(OH)CH— structure (methylene 3), respectively.

The amount of the methylene groups (S) (mole fraction) in the —CH(OH)—CH$_2$-(OCOCH$_3$)CH— structure was determined using the peak area ratio calculated from the integral curve.

The amount of the hydroxyl groups (T) (mole fraction) and the amount of the acetyl groups (U) (mole fraction) were determined by the following equation.

$T =$ (amount of methylene 3) $+$ (amount of methylene 2)/2
$U = 1 - T$

Preparation of the Film (A)

Using the same procedure as for the preparation of the film (A) of Example 1, the polyvinyl acetal (A) described above was formed into the film (A) with a thickness of 0.20 mm.

Preparation of the Resin (B)

Using the same procedure as for the preparation of the resin (B) of Example 1, white powder of the polyvinyl acetal resin (B) with a degree of acetalization of 65.9 mole % and an amount of acetyl groups of 0.7 mole % was obtained.

Preparation of the Film (B)

Using the same procedure as for the preparation of the film (B) of Example 1, the polyvinyl acetal (B) described above was formed into the film (B) with a thickness of 0.240 mm.

Making Laminated Glass

Using the same procedure as for making the laminated glass of Example 1, the transparent laminated glass was made.

Measurement of the Sound Insulation

The sound insulation at prescribed temperatures was measured for Examples 34–40 described above and Comparative examples 18-19.

The measurement results are summarized in Table 7.

TABLE 7

| | Resin Composition | | | | | | |
|---|---|---|---|---|---|---|---|
| | Resin A | | | | | | |
| | Amount of Acetylgroups | Degree of Acetalization | S Mole fraction | T Mole fraction | U Mole fraction | Degree of blocking Y | Plasticizer (Wt. parts) |
| Ex. 34 | 11.5 | n-butyl 60.2 | 0.0539 | 0.871 | 0.129 | 0.24 | 50 |
| Ex. 35 | 10.0 | n-hexyl 48.1 | 0.0368 | 0.908 | 0.0920 | 0.22 | 55 |
| Ex. 36 | 17.9 | n-butyl 56.2 | 0.0757 | 0.823 | 0.177 | 0.26 | 45 |
| Ex. 37 | 20.1 | n-butyl 52.3 | 0.0576 | 0.800 | 0.200 | 0.18 | 65 |
| Ex. 38 | 27.8 | n-butyl 45.6 | 0.141 | 0.734 | 0.266 | 0.36 | 40 |
| Ex. 39 | 14.3 | n-valer 58.2 | 0.0718 | 0.861 | 0.139 | 0.30 | 55 |
| Ex. 40 | 11.5 | n-butyl 59.5 | 0.0615 | 0.896 | 0.104 | 0.33 | 50 |
| Comp. Ex. 18 | | | | | | | |
| Comp. Ex. 19 | 11.5 | n-octyl 58.5 | 0.145 | 0.799 | 0.201 | 0.45 | 40 |

| | Resin Composition | | | Lamination Configuration | TL Value dB | | | |
|---|---|---|---|---|---|---|---|---|
| | Resin B | | | | | | | |
| | Amount of Acetylgroups | Degree of Acetalization | Plasticizer (Wt parts) | Lamination Thickness (mm) | 10° C. | 20° C. | 30° C. | 40° C. |
| Ex. 34 | 0.7 | n-butyl 65.9 | 40 | B/A/B 0.2/0.2/0.2 | 36 | 38 | 37 | 36 |
| Ex. 35 | 2.4 | propyl 68.8 | 40 | B/A/B 0.3/0.4/0.2 | 36 | 38 | 37 | 35 |
| Ex. 36 | 0.7 | n-butyl 64.5 | 35 | B/A/A/B 0.1/0.2/0.1/0.15 | 36 | 38 | 37 | 36 |
| Ex. 37 | 0.7 | n-butyl 64.5 | 40 | B/A/B 0.3/0.05/0.3 | 37 | 38 | 37 | 35 |
| Ex. 38 | 0.7 | n-butyl 64.5 | 35 | A/B/A 0.1/0.3/0.2 | 35 | 37 | 36 | 35 |
| Ex. 39 | 2.4 | n-butyl 72.3 | 40 | B/A/B/B 0.1/0.05/0.15/0.1 | 35 | 37 | 36 | 35 |
| Ex. 40 | 0.7 | n-butyl 64.5 | 45 | A/B 0.3/0.2 | 36 | 38 | 36 | 35 |
| Comp. Ex. 18 | 0.7 | n-butyl 65.9 | 40 | B 0.7 | 28 | 30 | 32 | 36 |
| Comp. Ex. 19 | 2.4 | n-butyl 66.3 | 40 | B/A/B 0.2/0.3/0.2 | 30 | 34 | 30 | 29 |

Ex. = Example
Comp. Ex. = Comparative Example

EXAMPLES 35-40

As shown in Table 7, interlayer films comprising the polyvinyl acetal resin (A) and the polyvinyl acetal resin (B) with different degrees of acetalization, different amounts of acetyl groups, different amounts of the plasticizer added, different thicknesses of the layers, different lamination configurations and different amounts of the ultraviolet light absorbent, within the scope of this invention, were prepared and laminated glass was made using them.

COMPARATIVE EXAMPLES 18-19

As shown in Table 7, interlayer films which do not fall within the scope of this invention were prepared, and laminated glass was made using them.

As clearly shown in Table 7, each laminated glass of this invention has a superior sound insulation performance over a wide temperature range.

EXAMPLE 41

Preparation of the Resin (A)

191 g of polyvinyl alcohol with a degree of polymerization of 1700 and a degree of blocking of the ethylene groups bonded to acetyl groups of 0.74 was added to 2890 g of pure water and heat-dissolved. The temperature of this reaction system was adjusted to 12° C., and 201 g of 35 wt % hydrochloric acid and 130 g of butyl aldehyde were added to precipitate polyvinyl acetal. Then, the temperature of the reaction system was kept at 50° C. for 5 hours to complete the reaction. Unreacted aldehyde was washed away by rinsing with an excess amount of water, the hydrochloric acid catalyst was neutralized, the salt was removed, and, after the drying process, white powder of the polyvinyl acetal resin (A) was obtained.

For this polyvinyl acetal resin (A), the degree of acetalization was 60.2 mole %, and the amount of acetyl groups was 12.5 mole %.

As for the definition of the degree of blocking, i.e. $Y=0.5 \times S/(T \times U)$, S, T and U in the equation were determined with the same technique as for Example 34 by using the 13C-NMR chart(s) of the polyvinyl alcohol.

Preparation of the Film (A)

50 g of the polyvinyl acetal (A) described above was collected, and 25 g of triethylene glycol-di-2-ethylbutylate, as the plasticizer and 0.15 g of BHT, as the antioxidant, were added to it, then the mixture was thoroughly kneaded by a mixing roll(s), and a prescribed amount of the kneaded material was held in a press molding machine for 30 minutes at 150° C. Thus, the 0.20 mm thick film (A) was prepared.

Preparation of the Resin (B)

Using the same procedure as for the preparation of the resin (B) of Example 1, white powder of the polyvinyl acetal resin (B) with a degree of acetalization of 65.9 mole % and an amount of acetyl groups of 0.9 mole % was obtained.

Preparation of the Film (B)

Using the same procedure as for the preparation of the film (B) of Example 1, the the polyvinyl acetal (B) described above was formed into the film (B) with a thickness of 0.240 mm.

Making Laminated Glass

Using the same procedure as for making the laminated glass of Example 1, the transparent laminated glass was made.

EXAMPLES 42–47

As shown in Table 8, interlayer films comprising the polyvinyl acetal resin (A) and the polyvinyl acetal resin (B) with different degrees of acetalization, different amounts of acetyl groups, different amounts of the plasticizer added, different thicknesses of the layers, different lamination configurations and different amounts of the ultraviolet light absorbent, within the scope of this invention, were prepared and laminated glass was made with them.

COMPARATIVE EXAMPLE 20

As shown in Table 8, an interlayer film which does not fall within the scope of this invention was prepared, and laminated glass was made using it.

Measurement of the Sound Insulation

The sound insulation at prescribed temperatures was measured for Examples 41–47 described above and Comparative example 20.

The measurement results are summarized in Table 8.

TABLE 8

| | Resin Composition | | | | | | |
|---|---|---|---|---|---|---|---|
| | Resin A | | | | | | |
| | Amount of Acetylgroups | Degree of Acetalization | S Mole fraction | T Mole fraction | U Mole fraction | Degree of blocking Y | Plasticizer (Wt. parts) |
| Ex. 41 | 12.5 | n-butyl 60.2 | 0.162 | 0.875 | 0.125 | 0.74 | 50 |
| Ex. 42 | 9.7 | n-hexyl 49.3 | 0.133 | 0.903 | 0.0970 | 0.76 | 55 |
| Ex. 43 | 17.9 | n-butyl 55.8 | 0.235 | 0.821 | 0.179 | 0.80 | 45 |
| Ex. 44 | 20.1 | n-butyl 51.9 | 0.225 | 0.799 | 0.201 | 0.70 | 65 |
| Ex. 45 | 27.8 | n-butyl 46.6 | 0.341 | 0.722 | 0.278 | 0.85 | 40 |
| Ex. 46 | 14.3 | n-valer 57.5 | 0.167 | 0.857 | 0.143 | 0.68 | 55 |
| Ex. 47 | 12.5 | n-butyl 58.8 | 0.149 | 0.875 | 0.125 | 0.68 | 50 |
| Comp. Ex. 20 | | | | | | | |

| | Resin Composition | | | Lamination Configuration | TL (Max) dB | |
|---|---|---|---|---|---|---|
| | Resin B | | | | | |
| | Amount of Acetylgroups | Degree of Acetalization | Plasticizer (Wt parts) | Lamination Thickness (mm) | Value (dB) | Temperature °C. |
| Ex. 41 | 0.9 | n-butyl 65.9 | 40 | B/A/B 0.2/0.2/0.2 | 40 | 24 |
| Ex. 42 | 2.4 | propyl 68.3 | 40 | A/B/A 0.2/0.4/0.2 | 39 | 23 |
| Ex. 43 | 0.9 | n-butyl 64.5 | 35 | B/A/B/A 0.1/0.1/0.1/0.25 | 40 | 22 |
| Ex. 44 | 0.9 | n-butyl 64.5 | 40 | B/A/B 0.4/0.05/0.4 | 40 | 20 |
| Ex. 45 | 0.9 | n-butyl 64.5 | 35 | A/B/A 0.1/0.25/0.2 | 40 | 21 |
| Ex. 46 | 2.4 | n-butyl 72.3 | 40 | B/A/B/A 0.1/0.05/0.20/0.1 | 40 | 22 |
| Ex. 47 | 0.9 | n-butyl 64.5 | 45 | A/B 0.3/0.15 | 40 | 24 |
| Comp. Ex. 20 | 0.9 | n-butyl 65.9 | 40 | B 0.76 | 37 | 41 |

As clearly shown in Table 8, each laminated glass of this invention has a superior sound insulation performance around room temperature.

EXAMPLE 48

Preparation of the Resin (A)

190 g of polyvinyl alcohol with a degree of polymerization of 1700 was added to 2890 g of pure water and heat-dissolved. The temperature of this reaction system was adjusted to 12° C., and 200 g of 35 wt % hydrochloric acid and 170 g of butyl aldehyde were added to precipitate polyvinyl acetal. Then, the temperature of the reaction system was kept at 45° C. for 6 hours to complete the reaction. Unreacted aldehyde was washed away by rinsing with an excess amount of water, the hydrochloric acid catalyst was neutralized, the salt was removed, and, after the drying process, white powder of the polyvinyl acetal resin (A) was obtained.

For this polyvinyl acetal resin (A), the degree of acetalization was 62.3 mole %, the amount of acetyl groups was 12.3 mole %, and the viscosity was 590 cP.

The viscosity of the polyvinyl acetal resin was measured by the following procedure.

A measured amount of the sample was added to 150 ml of a mixed solvent of ethanol and toluene (weight ratio 1:1) in a conical flask to adjust the resin concentration to 10±0.1 wt %, and shaking dissolution was conducted for 3 hours or more in a thermostatic chamber at 20° C. Then, this solution was injected into the measurement tube, ID 43±2 mm, the temperature was kept at 20±0.2° C., and the viscosity was measured using a BM type viscometer.

Preparation of the Film (A)

50 g of the polyvinyl acetal (A) described above was collected, and 25 g of triethylene glycol-di-2-ethylbutylate, as the plasticizer, and 0.05 g of 2-(2'-hydroxy-5'-methylphenyl) benzotriazole, as the ultraviolet light absorbent, and 0.05 g of BHT, as the antioxidant, were added to it, then the mixture was thoroughly kneaded by a mixing roll(s), and a prescribed amount of the kneaded material was held in a press molding machine for 30 minutes at 150° C. Thus, the 0.38 mm thick film (A) was prepared.

Preparation of the Resin (B)

Using the same procedure as for the preparation of the resin (B) of Example 1, white powder of the polyvinyl acetal resin (B) with a degree of acetalization of 66.3 mole % and an amount of acetyl groups of 0.9 mole % was obtained.

Preparation of the Film

Using the same e as for the preparation of the film (B) of Example 1, the polyvinyl acetal (B) described above was formed into the films (B) with thicknesses of 0.30 mm and 0.40 mm.

Making the Laminated Glass

Using the same procedure as for making the laminated glass of Example 1, the transparent laminated glass was made.

EXAMPLES 49-50

As shown in Table 9, interlayer films comprising the polyvinyl acetal resin (A) and the polyvinyl acetal resin (B) with different degrees of acetalization, different amounts of acetyl groups, different amounts of the plasticizer added, different thickness of the layers, different lamination configurations, and different amounts of the ultraviolet light absorbent, within the scope of this invention, were prepared and laminated glass was made using them.

COMPARATIVE EXAMPLES 21-25

As shown in Table 9, interlayer films which do not fall within the scope of this invention were prepared, and laminated glass was made using them.

Measurement of the Sound Insulation

The sound insulation at prescribed temperatures was measured for Examples 48-50 described above and Comparative examples 21-25.

The measurement results are summarized in Table 9.

TABLE 9

| | Resin Composition (mol %) | | | | | | |
| --- | --- | --- | --- | --- | --- | --- | --- |
| | Resin A | | | | Resin B | | |
| | Amount of Acetylgroups | Degree of Acetalization | Plasticizer (Wt. parts) | Viscosity cP | Amount of Acetylgroups | Degree of Acetlaziation | Plasticizer (Wt parts) |
| Ex. 48 | 12.3 | n-butyl 62.3 | 50 | 590 | 0.9 | n-butyl 65.9 | 40 |
| Ex. 49 | 20.4 | n-butyl 55.3 | 50 | Dial 320 | 0.9 | n-butyl 65.9 | 40 |
| Ex. 50 | 10.3 | n-hexyl 56.2 | 40 | | 0.9 | n-butyl 65.9 | 35 |
| Comp. Ex. 21 | 0.9 | n-butyl 65.9 | 40 | 100 | | | |
| Comp. Ex. 22 | 12.4 | n-butyl 60.3 | 40 | 90 | | | |
| Comp. Ex. 23 | 10.3 | n-butyl 62.7 | 45 | Dial 2200 | | | |
| Comp. Ex. 24 | 6.5 | n-butyl 61.9 | 45 | 410 | 0.9 | n-butyl 65.9 | 40 |
| Comp. Ex. 25 | 0.9 | n-hexyl 55.3 | 50 | 90 | 0.9 | n-butyl 65.9 | 40 |

| | Lamination Configuration Lamination Thickness (mm) | Film Thickness (mm) | TL Value (dB) | | | |
| --- | --- | --- | --- | --- | --- | --- |
| | | | 10° C. | 20° C. | 30° C. | 40° C. |
| Ex. 48 | B/A/B 0.3/0.2/0.4 | 0.9 | 34 | 38 | 37 | 34 |

TABLE 9-continued

| | | | | | | |
|---|---|---|---|---|---|---|
| Ex. 49 | B/A/B 0.2/0.1/0.2 | 0.5 | 35 | 38 | 37 | 35 |
| Ex. 50 | B/A/B/A 0.2/0.3/0.2/0.3 | 1.0 | 36 | 38 | 34 | 35 |
| Comp. Ex. 21 | A 0.76 | 0.76 | 24 | 29 | 35 | 36 |
| Comp. Ex. 22 | A 0.76 | 0.76 | 31 | 34 | 36 | 32 |
| Comp. Ex. 23 | A 0.38 | 0.38 | 30 | 34 | 35 | 31 |
| Comp. Ex. 24 | B/A/B 0.3/0.1/0.4 | 0.8 | 30 | 33 | 37 | 33 |
| Comp. Ex. 25 | B/A/B 0.2/0.2/0.2 | 0.8 | 35 | 37 | 34 | 31 |

Ex. = Example
Comp. Ex. = Comparative Example
Dial = Cross-linking is done using aldehyde with two or more aldehyde groups As clearly shown in Table 9, each laminated glass of this invention has a superior sound insulation performance over a wide temperature range.

MANUFACTURING EXAMPLES

Manufacturing examples of the polyvinyl acetal resin for which 90% or more of the distribution of the degree of acetalization falls in the range between −2% and +2% from the average degree of acetalization are described as Reference examples 1 and 2. Also, manufacturing examples of the polyvinyl acetal resin for which 10–30% of the distribution of the degree of acetalization falls outside of the range between −10% and +10% from the average degree of acetalization are described as Reference examples 3 and 4.

REFERENCE EXAMPLE 1

193 g of polyvinyl alcohol with a degree of polymerization of 1700 and a degree of saponification of 98.9 mole % was added to 2900 g of pure water and heat-dissolved. The temperature of this reaction system was adjusted to 5° C., and 201 g of 35 wt % hydrochloric acid and 192 g of n-hexyl aldehyde were added to precipitate polyvinyl acetal. Then, the temperature of the reaction system was kept at 35° C. for 5 hours to complete the reaction. Unreacted aldehyde was washed away by rinsing with an excess amount of water, the hydrochloric acid catalyst was neutralized, the salt was removed, and, after the drying process, white powder of polyvinyl acetal resin was obtained.

For this polyvinyl acetal resin, the degree of acetalization was 64.0 mole %, and 94% of the distribution of the degree of acetalization falls within the range between −2% and +2% from the average degree of acetalization.

The distribution of the degree of acetalization of the polyvinyl acetal resin was measured with the following procedure, using liquid chromatography.

First, a polar liquid (such as water) is flowing in the column as the eluent. When the polyvinyl acetal resin, completely dissolved in a solvent such as ethanol, is injected into the column, only the portion of the resin which has a high polarity (portion with a low degree of acetalization) is eluted and detected. By decreasing the polarity of the eluent gradually (for example, water → ethanol → ethyl acetate, . . . ), portions with lower polarities (portions with higher degrees of acetalization) can be eluted and detected one after another. Finally, by feeding a non-polar liquid (toluene, for example), everything including the resin portion with the lowest polarity (portion with the highest degree of acetalization) can be eluted and detected. Using these fractions obtained one after another, the distribution of the degree of acetalization can be determined.

REFERENCE EXAMPLE 2

White powder of polyvinyl acetal resin was obtained by the same procedure as for Reference example 1, except that a polyvinyl alcohol with a degree of polymerization of 1700 and a degree of sapnonification of 87.8 mole % was used and that n-hexyl aldehyde was used instead of n-butyl aldehyde.

For this polyvinyl acetal resin, the degree of acetalization was 57.2 mole %, and 92% of the distribution of the degree of acetalization falls within the range between −2% and +2% from the average degree of acetalization.

REFERENCE EXAMPLE 3

193 g of polyvinyl alcohol with a degree of polymerization of 1700 and a degree of saponification of 98.9 mole % was added to 2900 g of pure water and heat-dissolved. The temperature of this reaction system was adjusted to 32° C., and 201 g of 35 wt % hydrochloric acid and 192 g of n-hexyl aldehyde were added to precipitate polyvinyl acetal. Then, the temperature of the reaction system was kept at 35° C. for 5 hours to complete the reaction. Unreacted aldehyde was washed away by rinsing with an excess amount of water, the hydrochloric acid catalyst was neutralized, the salt was removed, and, after the drying process, white powder of polyvinyl acetal resin was obtained.

For this polyvinyl acetal resin, the degree of acetalization was 62.9 mole %, and 19% of the distribution of the degree of acetalization falls within the range −10% or further from the average degree of acetalization and 12% of the distribution of the degree of acetalization falls in the range +10% or further from the average degree of acetalization.

REFERENCE EXAMPLE 4

White powder of polyvinyl acetal resin was obtained by the same procedure as for Reference example 1, except that a polyvinyl alcohol with a degree of polymerization of 1700 and a degree of sapnonification of 87.8 mole % was used, that n-hexyl aldehyde was used instead of n-butyl aldehyde, and that the temperature of the reaction system was adjusted at 40° C.

For this polyvinyl acetal resin, the degree of acetalization was 56.9 mole %, and 20% of the distribution of the degree of acetalization falls within the range −10% or further from the average degree of acetalization and 10% of the distribution of the degree of acetalization falls in the range +10% or further from the average degree of acetalization.

What is claimed is:

1. An interlayer film for laminated glass comprising laminated layers of at least one layer (A) which comprises a plasticizer and polyvinyl acetal resin for which the number of carbon atoms in the acetal group is 4, 5 or 6, and the mole ratio of the average amount of the ethylene groups bonded to acetyl groups is 8–30 mole % of the total amount of the main chain ethylene groups, and at least one layer (B) which comprises a plasticizer and polyvinyl acetal resin for which the number of carbon atoms in the acetal group is 3 or 4, and the mole ratio of the amount of average ethylene groups bonded to acetyl groups is 4 mole % or less of the total amount of the main chain ethylene groups.

2. The interlayer film for laminated glass in accordance with claim 1, wherein the standard deviation, $\sigma$, of the amount of the ethylene groups bonded to acetyl groups is 0.8 or less for the polyvinyl acetal resin in layer (A).

3. The interlayer film for laminated glass in accordance with claim 1, wherein the standard deviation, $\sigma$, of the amount of the ethylene groups bonded to acetyl groups is 2.5–8 for the polyvinyl acetal resin in layer (A).

4. The interlayer film for laminated glass in accordance with claim 1, wherein the polyvinyl acetal resin in layer (A) has a molecular weight distribution ratio (weight average molecular weight Mw/number average molecular weight Mn) of 1.01–1.50.

5. The interlayer film for laminated glass in accordance with claim 1, wherein the polyvinyl acetal resin in layer (A) has the molecular weight distribution ratio (weight average molecular weight Mw/number average molecular weight Mn) of 3.5–20.

6. The interlayer film for laminated glass in accordance with claim 1, wherein, of a plurality of laminated layers, at least the outmost layer on the side which needs to be weather-resistant comprises layer (B) that contains an ultraviolet light absorbent with an effective ultraviolet light absorption wave length of 300–340 nm so that the ultraviolet light absorption coefficient is 0.01 or more.

7. The interlayer film for laminated glass in accordance with claim 1, wherein the degree of blocking, Y, of the ethylene groups bonded to acetyl groups, as defined below, is 0.15–0.40 for the polyvinyl acetal resin in layer (A): Degree of blocking $Y=0.5\times S/(T\times U)$ where, S, T and U in the equation stand for the amount of the methylene groups (S), the amount of the hydroxyl groups (T) and the amount of the acetyl groups (U), respectively, in the —CH(OH)—CH$_2$—(OCOCH$_3$)CH— structure.

8. The interlayer film for laminated glass in accordance with claim 1, wherein the degree of blocking, Y, of the ethylene groups bonded to acetyl groups, as defined below, is 0.55–0.90 for the polyvinyl acetal resin in layer (A): Degree of blocking $Y=0.5\times S/(T\times U)$ where, S, T and U in the equation stand for the amount of the methylene groups (S), the amount of the hydroxyl groups (T) and the amount of the acetyl groups (U), respectively, in the —CH(OH)—CH$_2$—(OCOCH$_3$)CH— structure.

* * * * *